(12) United States Patent
Tuatini et al.

(10) Patent No.: US 9,898,498 B2
(45) Date of Patent: Feb. 20, 2018

(54) AGE-BASED POLICIES FOR DETERMINING DATABASE CACHE HITS

(71) Applicant: ORACLE INTERNATIONAL CORPORATION, Redwood Shores, CA (US)

(72) Inventors: Jeffrey Taihana Tuatini, Greenbrae, CA (US); Bradley Harold Sergeant, Portland, OR (US); Qing Zou, Sunnyvale, CA (US); Arun Ananthanarayanan Tharuvai, Daly City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 401 days.

(21) Appl. No.: 14/798,293

(22) Filed: Jul. 13, 2015

(65) Prior Publication Data

US 2016/0012099 A1    Jan. 14, 2016

Related U.S. Application Data

(60) Provisional application No. 62/024,435, filed on Jul. 14, 2014, provisional application No. 62/026,483, filed on Jul. 18, 2014.

(51) Int. Cl.
*G06F 17/00* (2006.01)
*G06F 17/30* (2006.01)
*G06Q 30/02* (2012.01)

(52) U.S. Cl.
CPC .. *G06F 17/30371* (2013.01); *G06F 17/30457* (2013.01); *G06F 17/30595* (2013.01); *G06Q 30/0271* (2013.01)

(58) Field of Classification Search
CPC ......... G06F 17/30371; G06F 17/30082; G06F 17/30507; G06F 17/30864; G06F 17/30303; G06F 17/30011; G06F 17/30997
USPC .................................................. 707/689, 694
See application file for complete search history.

(56) References Cited

U.S. PATENT DOCUMENTS

| | | | |
|---|---|---|---|
| 5,826,239 A | 10/1998 | Du et al. | |
| 8,090,612 B2 | 1/2012 | Chao et al. | |
| 8,417,678 B2 * | 4/2013 | Bone ................. | G06F 17/30221 707/694 |
| 8,510,264 B1 | 8/2013 | Tamm et al. | |

(Continued)

FOREIGN PATENT DOCUMENTS

WO    WO 03036420 A2    5/2003

OTHER PUBLICATIONS

Non-Final Office Action for U.S. Appl. No. 12/985,269 dated Feb. 27, 2013.

(Continued)

*Primary Examiner* — Dung K Chau
(74) *Attorney, Agent, or Firm* — Miles & Stockbridge P.C.

(57) ABSTRACT

Systems and methods are provided for high-performance data processing. A policy is received that indicates a cutoff time. A request is processed to return the data item from the cache if the cutoff time is satisfied for the data item or return the data item from the database or not at all if the cutoff time is not satisfied for the data item. If the data item retrieved from the database, metadata associated with the data item is stored to indicate when the data item was last marked as in sync with the database.

26 Claims, 21 Drawing Sheets

(56) References Cited

U.S. PATENT DOCUMENTS

| | | | |
|---|---|---|---|
| 8,719,225 B1* | 5/2014 | Rath | G06F 17/30578 |
| | | | 707/634 |
| 8,775,448 B2 | 7/2014 | Tuatini et al. | |
| 8,869,256 B2 | 10/2014 | Sample | |
| 2003/0144898 A1 | 7/2003 | Bibelnieks et al. | |
| 2004/0015504 A1* | 1/2004 | Ahad | G06F 17/3048 |
| 2004/0204973 A1 | 10/2004 | Witting et al. | |
| 2005/0192986 A1 | 9/2005 | Butler | |
| 2006/0053181 A1* | 3/2006 | Anand | G06F 11/0715 |
| 2006/0253318 A1 | 11/2006 | Ramsey et al. | |
| 2007/0156842 A1* | 7/2007 | Vermeulen | G06F 17/30212 |
| | | | 709/217 |
| 2007/0208602 A1 | 9/2007 | Nocera et al. | |
| 2007/0250505 A1 | 10/2007 | Yang et al. | |
| 2008/0027788 A1 | 1/2008 | Lawrence et al. | |
| 2008/0040191 A1 | 2/2008 | Chakravarty et al. | |
| 2008/0065435 A1 | 3/2008 | Ratzloff | |
| 2008/0262925 A1 | 10/2008 | Kim et al. | |
| 2010/0070448 A1* | 3/2010 | Omoigui | H01L 27/1463 |
| | | | 706/47 |
| 2010/0250477 A1 | 9/2010 | Yadav | |
| 2010/0274661 A1 | 10/2010 | Aaltonen et al. | |
| 2011/0099152 A1* | 4/2011 | Law | G06F 17/30115 |
| | | | 707/689 |
| 2011/0282735 A1 | 11/2011 | Kordis et al. | |
| 2012/0130802 A1 | 5/2012 | Shimizu | |
| 2012/0173340 A1 | 7/2012 | Zhao | |
| 2012/0191546 A1 | 7/2012 | Phelan et al. | |
| 2014/0181039 A1* | 6/2014 | Harrison | G06F 17/30091 |
| | | | 707/652 |
| 2014/0181579 A1* | 6/2014 | Whitehead | G06F 17/30289 |
| | | | 714/15 |

OTHER PUBLICATIONS

Final Office Action for U.S. Appl. No. 12/985,269 dated Sep. 24, 2013.
Advisory Action for U.S. Appl. No. 12/985,269 dated Jan. 16, 2014.
Advisory Action for U.S. Appl. No. 12/985,269 dated Dec. 13, 2013.
Non-Final Office Action for U.S. Appl. No. 13/229,610 dated Oct. 4, 2013.
Non-Final Office Action for U.S. Appl. No. 13/229,610 dated Jul. 18, 2012.
Final Office Action for U.S. Appl. No. 13/229,610 dated Jan. 31, 2013.
Non-final Office Action dated Jul. 10, 2014 for U.S. Appl. No. 12/985,269.
Non-final Office Action dated Oct. 17, 2014 for U.S. Appl. No. 13/229,610.
Final Office Action dated Oct. 30, 2014 for U.S. Appl. No. 12/985,269.
Non-final Office Action Apr. 6, 2015 for U.S. Appl. No. 12/985,269.
Final Office Action dated May 26, 2015 for U.S. Appl. No. 13/229,610.
Final Office Action dated Jul. 22, 2015 for related U.S. Appl. No. 12/985,269.
Non-final Office Action dated Sep. 25, 2015 for related U.S. Appl. No. 13/229,610.
FrancescoChemolli, SquidFaq, InnerWorkings, Squid Web Proxy Wiki, Oct. 27, 2013, 17 pages.
Twilio, Inc., "TwiML Message: Twilio's Request", Mar. 26, 2013, 2 pages.
Mobivate, "psms aggregator", Jan. 14, 2013, 3 pages.
Ford, "IT Research BYTE" LOL: Laugh out Loud or Lots of Love? Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.
International Search Report and Written Opinion dated Oct. 15, 2015 for corresponding PCT Patent Application No. PCT/US2015/040225, 11 pages.
Edith Cohen, et al., "Refreshment policies for Web content caches", Computer Networks, Nov. 8, 2001, 14 pages.
Non-final Office Action dated Dec. 21, 2015 for related U.S. Appl. No. 14/029,390.
Alkis Simitsis, "Optimizing Analytic Data Flows for Multiple Execution Engines", May 20-24, 2012.
Non-final Office Action dated Jan. 22, 2016 for related U.S. Appl. No. 12/985,269.
Notice of Allowance and Fee(s) due dated May 3, 2016 for related U.S. Appl. No. 14/029,390.
Notice of Allowance and Fee(s) due dated May 27, 2016 for related U.S. Appl. No. 12/985,269.
Non-final Office Action dated Sep. 29, 2016 for related U.S. Appl. No. 14/564,658.

* cited by examiner

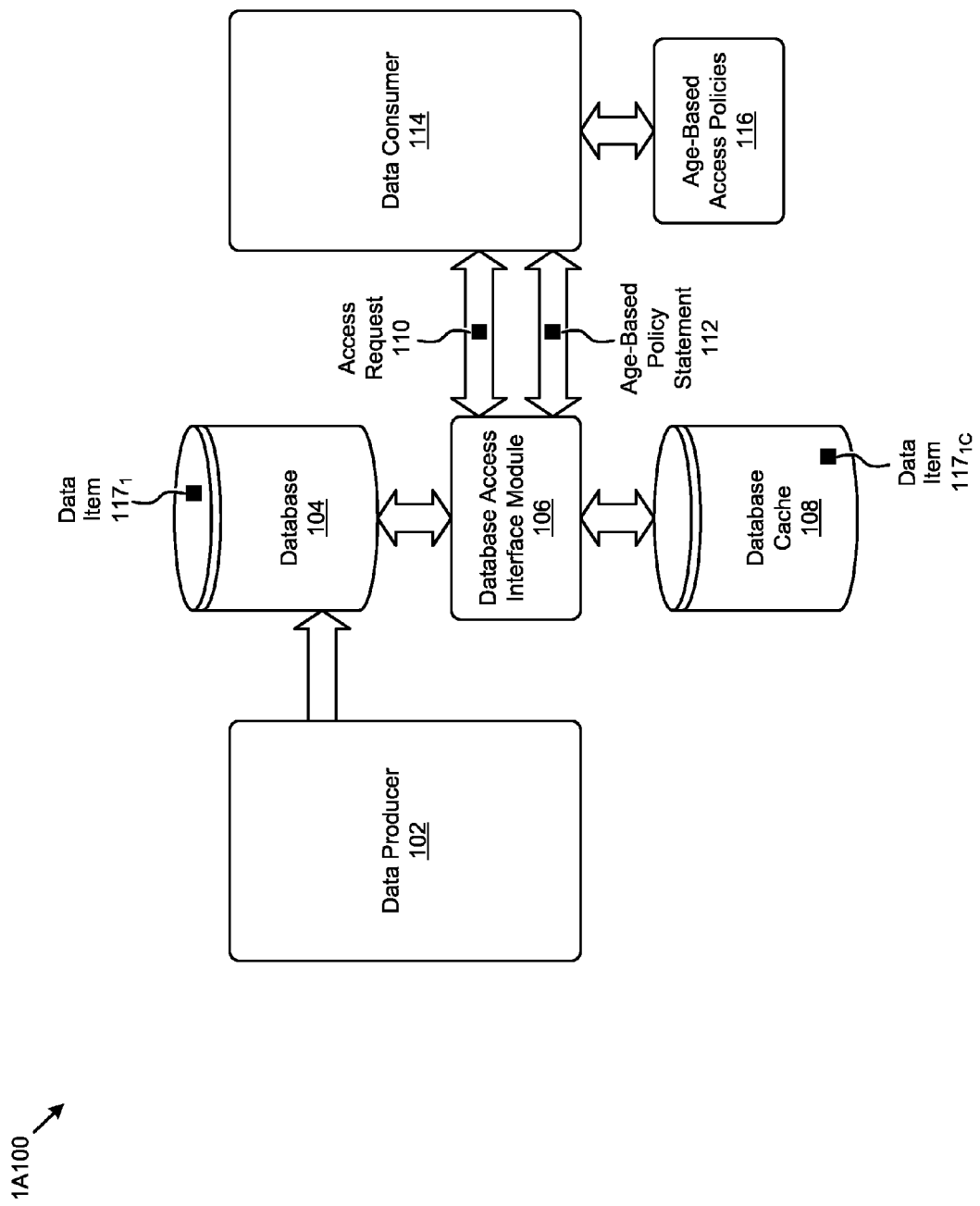
FIG. 1A1

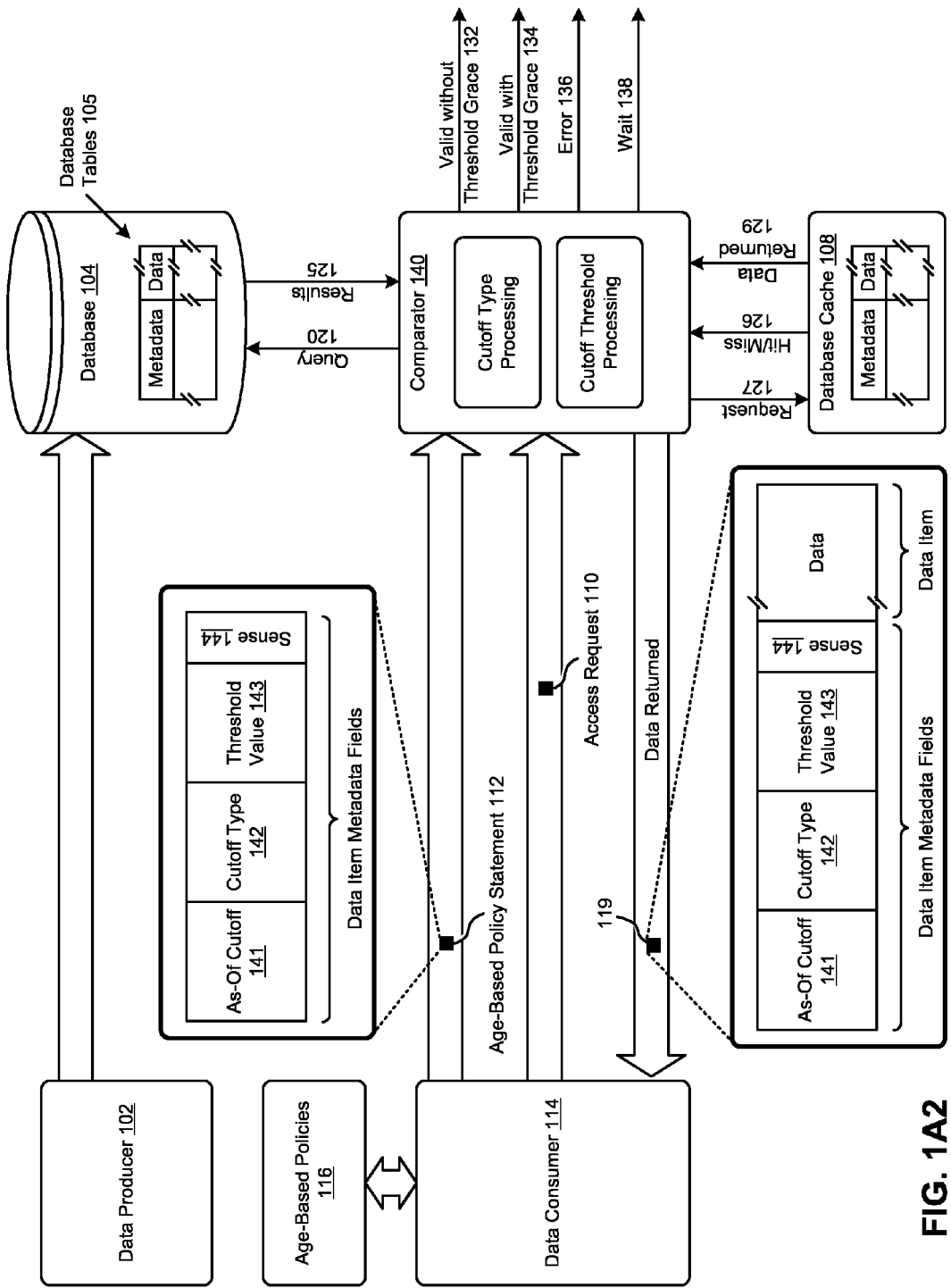
FIG. 1A2

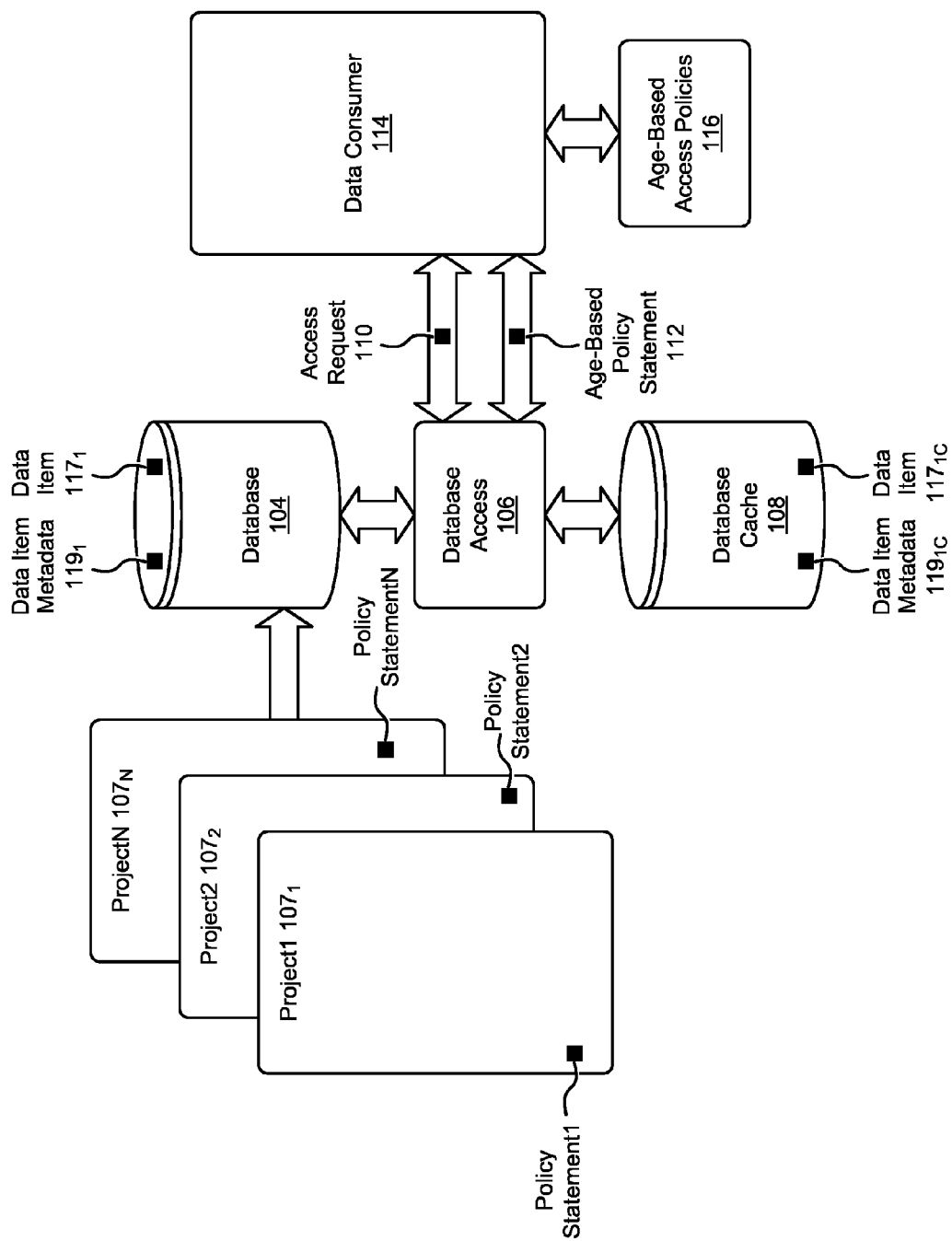
FIG. 1A3

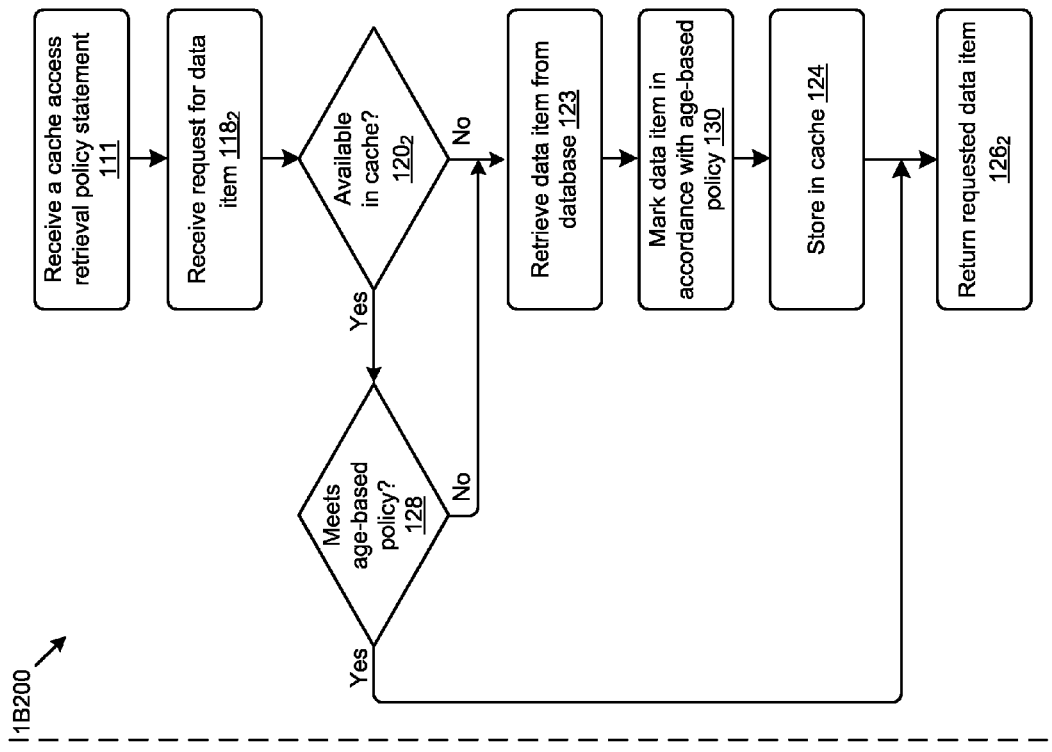
FIG. 1B2
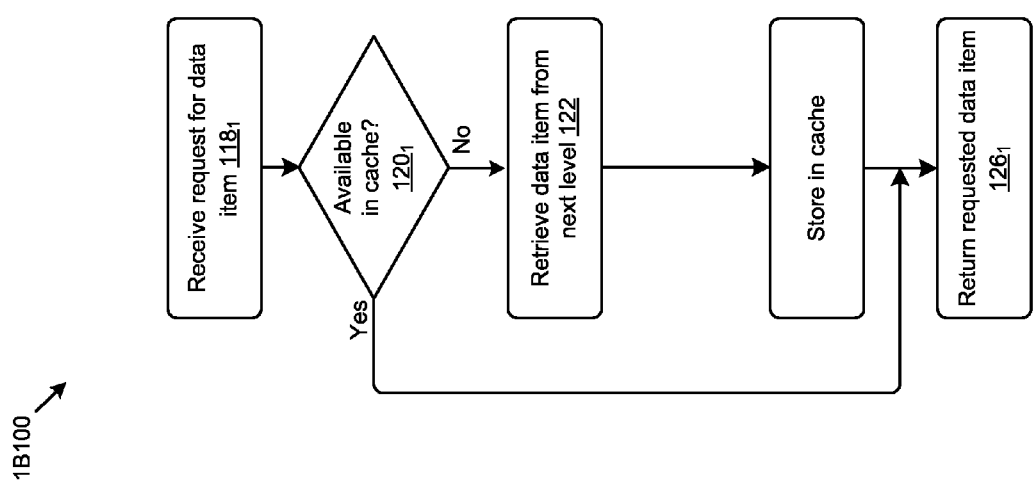
FIG. 1B1

| Column / Row | Aspect | LRU Cache | As-Of Semantics |
|---|---|---|---|
| 1 | Data item metadata | Timestamp of entry into cache | Timestamp of data item when last retrieved from database |
| 2 | Test for "Hit" | Is data present and not stale compared to "Now"? | Is data item valid "As Of" a date or "As Of" a position in a sequence? |
| 3 | Operation of "Miss" | Retrieve from next level | A cached data item that does meet "As Of" validity is queried from database |

AGE-BASED POLICIES FOR DETERMINING DATABASE CACHE HITS

RELATED APPLICATIONS

The present application claims the benefit of priority to U.S. Provisional Patent Application Ser. No. 62/024,435, titled, "SYSTEM, METHOD, AND ARCHITECTURE FOR IMPLEMENTING MARKETING CAMPAIGNS WITH MESSAGE PERSONALIZATION" filed on Jul. 14, 2014, which is hereby incorporated by reference in its entirety; and the present application claims the benefit of priority to U.S. Provisional Patent Application Ser. No. 62/026,483 titled, "SYSTEM, METHOD, AND ARCHITECTURE FOR USING TARGET LIST BUILD TO PERFORM MESSAGE PERSONALIZATION", filed Jul. 18, 2014, which is hereby incorporated by reference in its entirety.

FIELD

This disclosure relates to the field of specialized high-performance database caches, and more particularly to techniques for age-based policies for determining database cache hits or misses.

BACKGROUND

Marketers are continually seeking better ways to create, execute, and automate campaigns with the goal of growing revenue and strengthening customer loyalty. A workflow engine can be used to generate output materials (e.g., email messages) used in the prosecution of marketing campaigns. A marketer can use the workflow engine to configure a series of connected workflow execution components that make up a marketing campaign. Some engines allow the marketer to visually design, manage, and automate a multi-stage life-cycle marketing program through a drag-and-drop user interface and a library of pre-built program templates.

Certain aspects of such marketing programs and constituent marketing campaigns emerge in the course of generating personalized messages (e.g., email messages, web page content, advertisement messages, text messages, various forms of mobile messaging, etc.). In a conventional process for generating personalized messages, the marketer designs a template during a design phase for a personalized message that includes stock message sections and personalization sections. The stock message sections contain standardized messages that are the same for all recipients of the personalized message. The personalization sections include fields based on commands that invoke queries to the marketer's relational database management system (RDBMS) or any other database system. During processing, a loop iterates through customer records in the database system to form one or more queries to retrieve data, which data is used to populate personalization sections of a personalized message before sending the personalized message to the customer.

When customer records in a marketer's database system number in the hundreds or a few thousand, the method described above may be executed in a reasonable amount of time. However, the method described above does not scale very well such as when the number of customer records increases to tens of thousands, millions, or even billions. In such cases, where a high throughput on the order of hundreds, thousands, tens of thousands, or more messages per second is desirable, the method described above exhibits too much latency to sustain the desired throughput. Moreover, the latency per message generated is highly variable when processing random reads of data associated with database look-ups.

The observed latency can be smoothed out by introducing a cache facility; however, if the data is constantly changing on the back-end database, the cache would often be "dirty" or out-of-sync with the back-end database.

SUMMARY

The present disclosure provides systems, methods, and in computer program products for age-based policies that vary between different executions of the same or different marketing campaigns in order to determine database cache hits. Certain embodiments are directed to technological solutions to provide age-based policies for determining age-based database cache hits (or misses) and enforcing age-based policies during cache access operations. Such embodiments advance the relevant technical fields as well as advancing peripheral technical fields. For example, practice of the disclosed techniques may reduce use of computer memory, reduce demand for computer processing power, and/or reduce communication overhead needed for age-based policies for determining database cache hits. As one specific example, use of the disclosed techniques and devices within the shown environments as depicted in the figures provide advances in the technical field of high-performance computing, advances in the technical fields of distributed storage, and advances that can also be applied to improve mass email marketing tools.

Embodiments include processing for retrieving data in a database system having a database cache. A cutoff policy having a value for a cutoff indication is received from a requesting computing module. The cutoff indication indicates a time value or other sequence value after which cache staleness is tolerated but before which cache staleness is not tolerated. A data item is to be returned to the requesting computing module directly from the cache when the cutoff policy is met. Request processing is initiated by accessing the database cache to retrieve an instance of the data item and to retrieve a corresponding instance of respective data item metadata. A comparator compares the respective data item metadata with the cutoff indication, and returns an instance of the data item to the requesting computing module when the when the cutoff policy is met. For example, the data item may be returned if the data item is up-to-date as of the cutoff time even if the data item is already stale at the time of request processing. When the cutoff indication is not met, the database is accessed to retrieve an instance of the data item that does meet the cutoff policy. The data item retrieved from the database is stored with respective metadata in the database cache.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 exemplifies a data flow practice as used in a marketing program that implements age-based policies for determining database cache hits, according to an embodiment.

FIG. 1A2 exemplifies data item metadata fields as used to implement age-based policies for determining database cache hits, according to an embodiment.

FIG. 1A3 exemplifies a data flow practice as used in a marketing program that implements age-based policies for determining database cache hits, according to an embodiment.

FIG. 1B1 is a flowchart depicting logic to handle cache accesses when determining database cache hits.

FIG. 1B2 is a flowchart depicting logic to handle cache accesses when observing age-based policies for determining database cache hits, according to an embodiment.

FIG. 1D is a comparison chart showing use of age-based policies when determining database cache hits or misses, according to an embodiment.

FIG. 2 is a block diagram of a data delivery platform architecture that observes age-based policies for determining database cache hits, according to some embodiments.

FIG. 3 is a block diagram of a personalization engine comprising personalization applications that observe age-based policies for determining database cache hits, according to some embodiments.

DETAILED DESCRIPTION

Figure 1C:
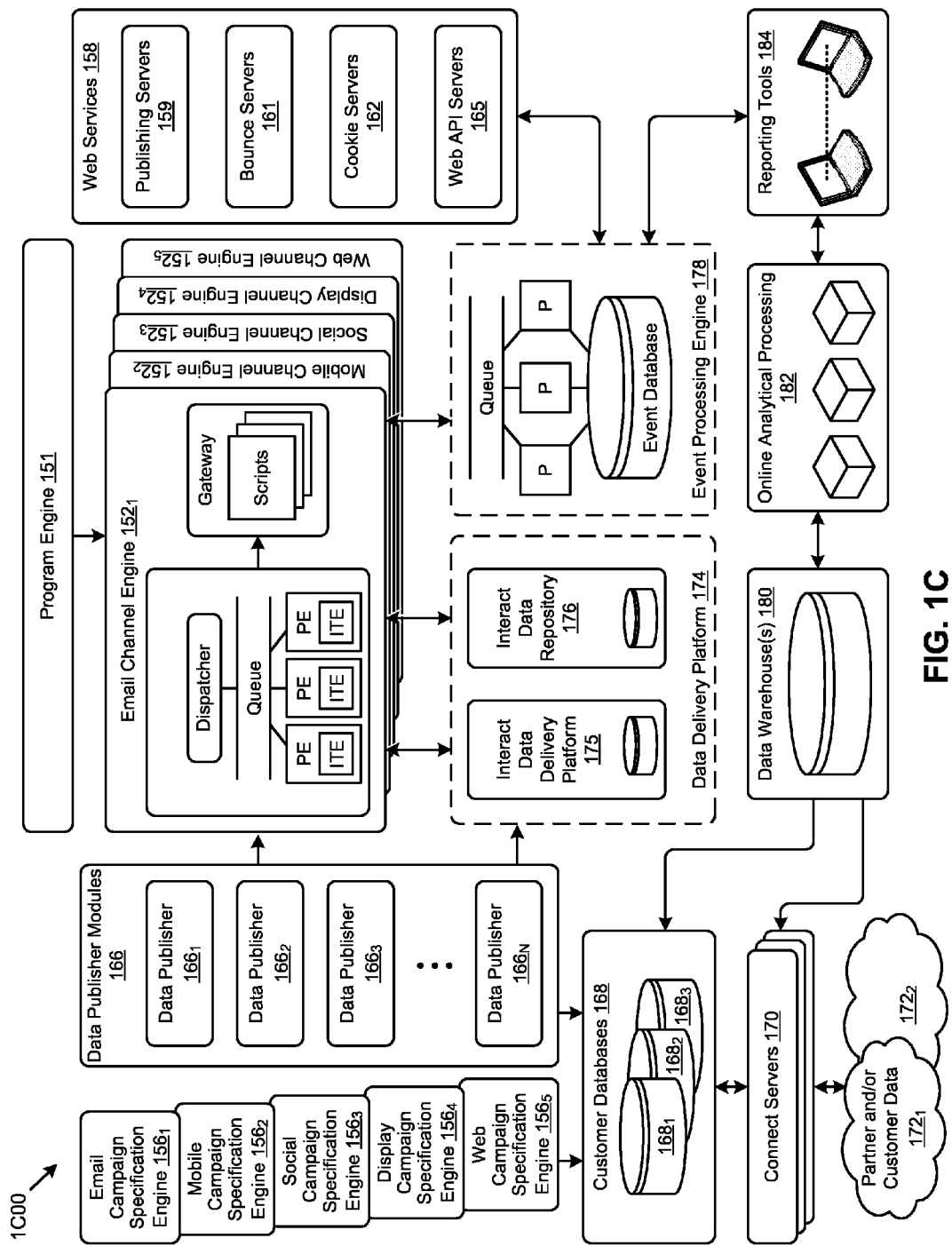
FIG. 1C is a block diagram of a marketing program system that observes age-based policies for determining database cache hits, according to an embodiment.

Some embodiments of the present disclosure address the problem of marketing campaigns that rely on data that is accessed repeatedly and can change very quickly so caches are populated with data as it is accessed. While prosecuting a marketing campaign, a database cache hit (or miss) needs to be determined based on age characteristics of the requested data item and some embodiments are directed to approaches for providing age-based policies that vary between different executions of the same or different marketing campaigns for determining database cache hits and enforcing such policies during cache operations. More particularly, disclosed herein and in the accompanying figures are exemplary environments, systems, methods, and computer program products for age-based policies for determining database cache hits.

Overview

Some embodiments of the disclosure pertain to a multitenant software as a service (SaaS) platform that can be used to deliver highly personalized messages (e.g., promotional messages, transactional messages, etc.) in or through any digital channel including email channels, mobile channels, web channels, advertisement display channels, social media channels, and etc. When the number of personalized messages reaches millions or even billions of personalized messages, a very high—and sustainably high—throughput is desirable, and in some cases is quantified in terms of, for example, throughput and latency. Such terms can be included in a contract or agreement pertaining to service level objectives (SLOs).

The herein-described architecture can deliver and sustain expected SLOs. One manner by which a particular SLO is achieved and sustained by providing an execution environment including a caching facility such that cached data items used to form message personalization are kept in sync with the master data that is located in peripheral environments (e.g., in a relational database management system (RDBMS)). As the cache data is populated and/or updated and/or synchronized, updated indicator metadata is maintained in the execution environment. The indicator metadata specifies how up-to-date a particular cached data item is as compared to a respective time that the same data item was updated in the RDBMS database. Personalization data is looked up from the cache and, in accordance with the herein disclosed techniques, the system maintains the caching execution environment with sufficient markings such that data items that can be tested against one or more age-based, or sequence-based validity tests.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

DEFINITIONS

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 exemplifies a data flow practice 1A100 as used in a marketing program that implements age-based policies for determining database cache hits. As an option, one or more instances of data flow practice 1A100 or any aspect thereof may be implemented in the context of the architecture and functionality of the embodiments described herein. Also, the data flow practice 1A100 or any aspect thereof may be implemented in any desired environment.

The embodiment shown in FIG. 1A1 includes a data producer 102 that stores data items into database 104. A data consumer 114 is configured to perform an access request 110 using one or another form of database access (e.g., a query language, an application programming interface, a middleware component, etc.). In high-performance systems, the function of a database access interface module 106 includes accessing a database cache module (e.g., database cache 108), which might hold a copy of a requested item. As shown, the requested item originates from the database 104 (e.g., see data item $117_1$), and a copy of the requested item is stored in the database cache (e.g., see data item $117_{1C}$). Also as shown, some metadata originates from the database 104 (e.g., see data item metadata $119_1$), and a copy of the metadata is stored in the database cache (e.g., see data item metadata $119_{1C}$.

The size and performance characteristics of the database cache 108 are tuned with respect to the database 104. For example, the database cache might be able to respond to access requests much faster than access requests made directly to the database. Also as an example, the database 104 might be much larger that the database cache. Various size optimization techniques are known in the art, and often such optimization techniques include one or more cost-performance tradeoffs.

In some situations (e.g., during execution of marketing campaigns) a data consumer might need to verify the validity of a data item requested, and such validity might be dependent on the specification of one or more age-based policies 116. The specification of one or more age-based policies can be stored as metadata, and can be transmitted over a network (e.g., in the form of an age-based policy statement 112) to a receiving unit such as a database access interface module 106). Various embodiments of a database access interface module 106 can include a comparison operation that compares age characteristics of a data item (e.g., using data item metadata fields) with an age-based requirement (e.g., as given in an age-based policy statement 112). One possible embodiment of a comparator and one possible codification of metadata is shown and described as pertains to FIG. 1A2.

Figure 2:
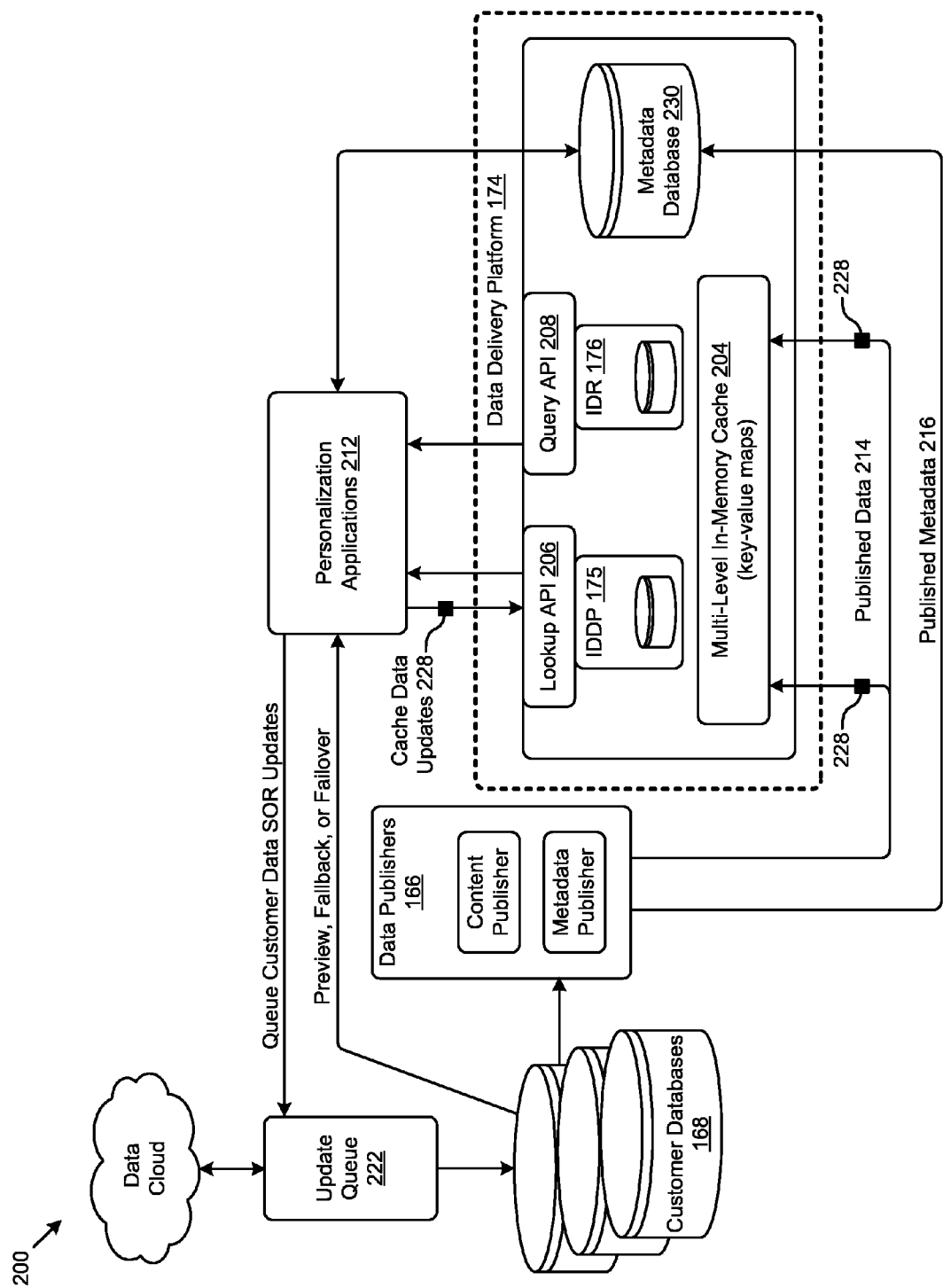

FIG. 1A2 exemplifies data item metadata fields as used to implement age-based policies for determining database cache hits. As described as pertaining to FIG. 1A1, a data producer 102 stores data items into database 104.

The age-based policy statement 112 provided to the receiving unit (e.g., by the data consumer to the cache) is used to determine whether the cached copy of the data can be used, and such a determination is based on whether or not the age-related metadata about the data meets the requirements of the age-based policy. Metadata can take on many forms. For example, instances of metadata items can include only metadata, or can include metadata that is associated with a respective data item. Metadata can include any information about a respective data item and, in some cases, metadata pertaining to a data item includes multiple fields. As shown, data item metadata packets 119 can include cutoff indications such as an "As-Of" cutoff 141, a cutoff type 142, a threshold value 143, and a sense 144. Strictly as examples, a cutoff indication given in an "As-Of" cutoff 141 might comprise a temporal value such as a date and/or a time in any format, and/or any sort of sequential value such as a sequence identifier. The "As-Of" cutoff or might comprise a version number or a string or symbol or any sort of starting value such as a date or a starting value such as a sequence identifier representing a position in a sequence. A cutoff type 142 might include a "before", or a "before or on", or an "after", or an "on or after" indication. In some cases a threshold value 143 corresponds to the cutoff type 142, and the semantics of the threshold value 143 relate to the cutoff type 142. For example, if the cutoff type refers to a date (e.g., with a date cutoff type identifier), then a threshold will be coded in terms of a date variation. If the cutoff type refers to an order in a sequence (e.g., with a sequence cutoff type identifier), then a threshold will be coded in terms of an order or sequence variation. As a convenience a sense indicator (e.g., see sense 144) can reverse the sense of a comparison. For example, if sense=1 then the comparator returns affirmatively when the data meets the cutoff given in the metadata. If sense=0 then the comparator returns negatively when the data meets the cutoff given in the metadata.

In the data flow shown, a data consumer 114 issues an access request 110 together with an age-based policy statement 112. The comparator 140 makes a request 127 to the database cache 108. The database cache returns a hit/miss indication 126 together with the requested data (e.g., see data returned 129), which requested data includes metadata pertaining to the requested item. Using the passed-in age-based policy statement and the metadata pertaining to the requested item, the comparator 140 performs cutoff type processing and cutoff threshold processing. The comparator can emit signals or indications as follows: (1) a signal is asserted when the comparison deems the cached copy of the requested data item to be valid even before applying a threshold (e.g., see valid without threshold grace signal 132); (2) a signal is asserted when the comparison deems the cached copy of the requested data item to be valid after applying a threshold (e.g., see valid with threshold grace signal 134); (3) an error indication is asserted when there is an unspecified error (e.g., see error signal 136); and (4) a wait signal is asserted when the comparator retrieves data from the database 104 (e.g., see wait signal 138).

When the comparison operations deems the cached copy of the requested data item to be not valid, or not valid "As-Of", then the comparator can automatically query the database (e.g., see query 120) and cache the results 125. In this embodiment, the results include data corresponding to the access request 110 as well as the metadata pertaining to the access request 110 (see database tables 105). When the data corresponding to the access request 110 and an age-based policy statement 112 (e.g., a respective age-based policy statement) has been retrieved, it can be delivered to the requestor (e.g., data consumer 114).

Figure 3:
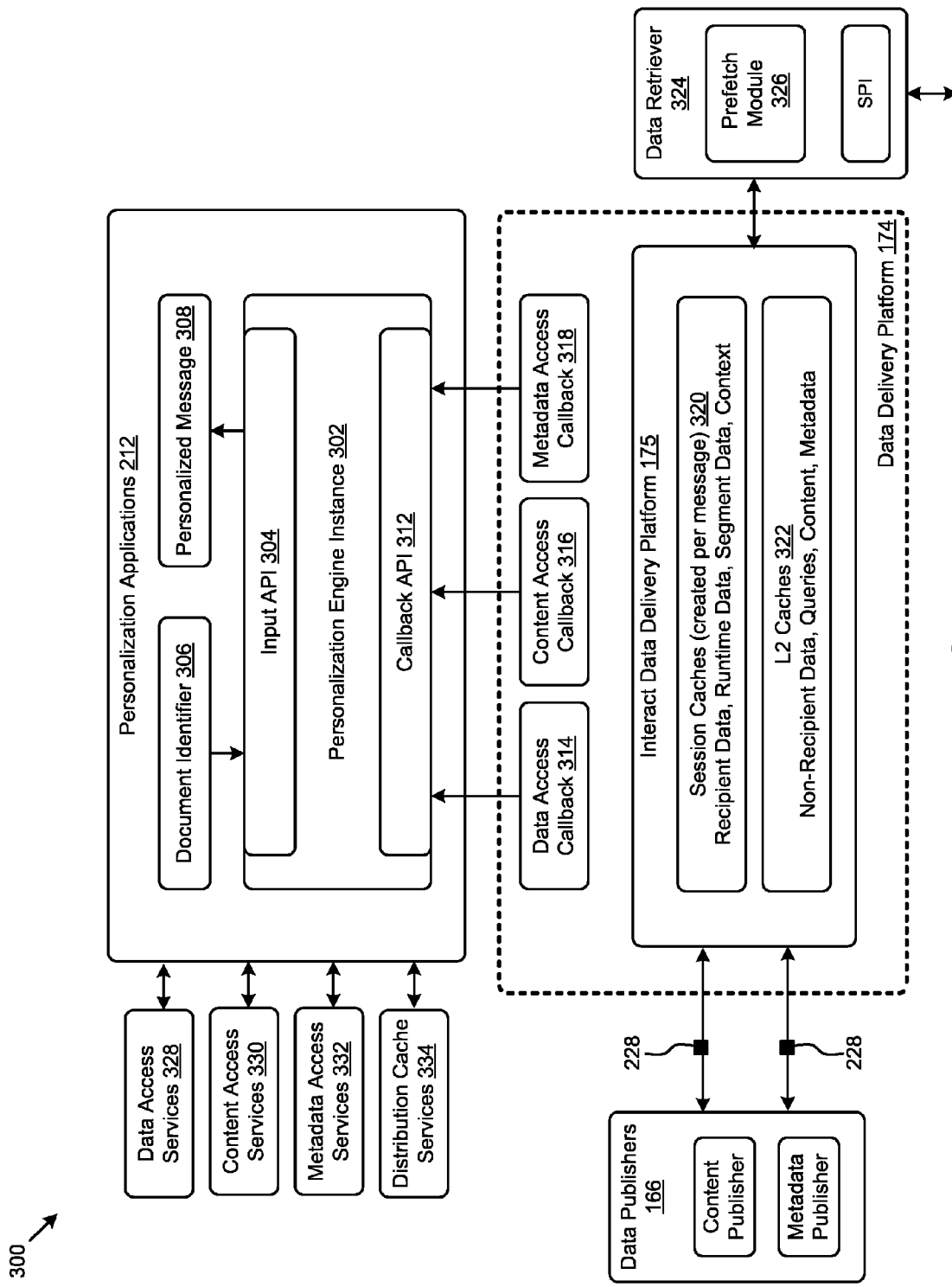

FIG. 1A3 exemplifies asynchronous changes between a data item and its respective data item metadata. A data producer can update a data item (e.g., see data item $117_1$). Also, a data producer can update the data item metadata (e.g., see data item metadata $119_1$). The data item can change while the data item metadata remains unchanged. Or the data item metadata can change while the data item remains unchanged. The environment supports concurrent execution of multiple projects (e.g., project1 $107_1$, project2 $107_2$, and projectN $107_N$). Any of the multiple projects can independently specify respective policies. Strictly as examples, a first project (e.g., Project1 $107_1$) can specify a cutoff time that is before a particular time, while a second project (e.g., Project1 $107_2$) can specify a cutoff time that is before a different particular time. And/or strictly as examples, the first project (e.g., Project1 $107_1$) can specify a cutoff time that is after a particular time, while a second project (e.g., Project2 $107_2$) can specify a cutoff time that is after a different particular time. The foregoing are merely examples, and any two or more different projects can have respective two or respective different cutoff points.

The aforementioned "before" and "after" semantics can be with respect to a project start time. For example, a project can be launched such that requested operations of the project can be carried out independently of requests for data items. In some cases, a project launch is purposely delayed until a particular start time (e.g., until the cutoff time), and requests for data items are commensurately delayed until the cutoff time. In other cases the project or projects commence before the cutoff time (e.g., the commencement of project launch is not delayed until the cutoff time).

FIG. 1B1 is a flowchart 1B100 depicting logic to handle cache accesses when determining database cache hits. As an option, one or more instances of flowchart 1B100 or any aspect thereof may be implemented in the context of the architecture and functionality of the embodiments described herein. Also, the flowchart 1B100 or any aspect thereof may be implemented in any desired environment.

The embodiment shown in FIG. 1B1 is merely one example of cache logic operated by a receiving unit (e.g., a cache unit). The flow begins upon receipt of cache access retrieval policy statement (see step 111). The logic flow continues as the receiving unit receives a request (see operation $118_1$) for a particular data item (for example, any data item covered by the of cache access retrieval policy statement). Then a decision is taken to determine if the requested data item is in a cache (see decision $120_1$). If so (see the "Yes" branch), then the requested data item is returned to the requestor (see operation $126_1$). The "No" branch is taken when the requested data is determined not to be in the cache. In some cases multiple levels of cache are implemented, and an attempt is made to retrieve from a next level (see operation 122).

FIG. 1B2 is a flowchart 1B200 depicting logic to handle cache accesses when observing age-based policies for determining database cache hits. As an option, one or more instances of flowchart 1B200 or any aspect thereof may be implemented in the context of the architecture and functionality of the embodiments described herein. Also, the flowchart 1B200 or any aspect thereof may be implemented in any desired environment.

The flow shown in FIG. 1B2 begins upon receipt of a request for a particular data item (see operation $118_2$). Then a decision is taken to determine if the requested data item is in cache (see decision $120_2$). If so (see the "Yes" branch), then the data item is compared using any one or more of the aforementioned age-based policy statements (see decision 128). When the data item does meet the age-based policy the data is returned to the requestor (see operation $126_2$). If either the "No" branch of the availability test (e.g., see decision $120_2$) or the "No" branch of the policy test (see decision 128) are taken, then the requested data item is retrieved from the database (see operation 123). The data item as retrieved from the database is marked or otherwise associated with respective data item metadata (see operation 130) and stored in cache (see operation 124).

The embodiment shown in FIG. 1B2 is merely one example. Additional examples are shown and described herein-below. In particular, a system that can deliver and sustain expected SLOs while executing a marketing program is shown and discussed as pertains to FIG. 1C.

FIG. 1C is a block diagram of a marketing program system 1C00 that observes age-based policies for determining database cache hits. As an option, one or more instances of marketing program system 1C00 or any aspect thereof may be implemented in the context of the architecture and functionality of the embodiments described herein. Also, the marketing program system 1C00 or any aspect thereof may be implemented in any desired environment.

FIG. 1C is a schematic diagram of a system architecture in which one or more embodiments of the disclosure may be practiced. A portion of the architecture comprises any number of entities that design or facilitate the design on marketing campaigns to be executed in the SaaS architecture. As shown, one or more campaign specification engines (e.g., email campaign specification engine $156_1$, mobile campaign specification engine $156_2$, social campaign specification engine $156_3$, display campaign specification engine $156_4$, web campaign specification engine $156_5$, etc.) are used to design and implement the marketing campaigns. These campaign specification engines can be implemented, for example, as design applications running on computing systems that are configurable to support the design of campaigns tailored for specific channels and/or specific mediums. Such channels and/or mediums include, for example, email, mobile applications, social media, web outlets, and various types of displays. A marketing person or campaign designer can use the design application to design the content to appear in the email campaign (e.g., text, images, video, etc.), which can then be stored into one or more databases (e.g., customer database $168_1$, customer database $168_2$, customer database $168_3$, etc.). In one embodiment, the design applications are provided to allow the user to visually design, manage, and automate a multi-stage marketing program. In some cases, design applications implement drag-and-drop user interfaces. A library of pre-built program templates can be provided in one or more databases.

In addition to design of content, a campaign designer may design a business workflow for a respective campaign. A business process management engine or workflow engine (e.g., program engine 151) can be used to implement the business execution actions or workflows for the campaign. The program engine comprises any entity or application that describes/designs the various decision points to implement and define the business workflow for the campaign that may be implemented as a multi-stage marketing campaign. The campaign marketer may further provide target lists and/or other data pertaining to the individuals to whom a marketing campaign is targeted. The aforementioned target lists and/or other data may include, for example, lists of customers as well as instructions to identify the subsets of the customer lists that should be the targets of personalized messages during the course of execution of the campaign. The customer databases 168 may therefore include relational data pertaining to customers.

Additional components of the marketing program system are configurable to publish campaign data to various components of the system. For example, data publisher modules (e.g., data publisher $166_1$, data publisher $166_2$, data publisher $166_3$, data publisher $166_N$, etc.) serve to publish data from the customer database to storage structures that hold the campaign and personalization data for access by the execution environment. A data delivery platform 174 is provided to hold the campaign and personalization data. Such campaign and personalization data can be stored in one or more data caches, and such data caches can access one or more data repositories such as the shown interact data repository 176 (IDR).

The marketing program system 1C00 comprises one or more servers that perform business processing pertaining to the marketing campaigns. In this SaaS architecture any of the shown servers may be used to service marketing campaigns for one or more customers. In some embodiments, the execution environment comprises an independent execution environment that is isolated from design and data management. The execution environment uses an in-memory cache of the personalization data that is kept in sync with the master data that is located in the design environment. As the cache data is synchronized, the metadata is kept in the execution environment that specifies how recent the cached data is compared to a time stamp or version stamp in a master database such as in the interact data repository 176.

In some embodiments, different types of engines may be provided to handle the different channels/types of marketing campaigns to be executed. For example, for an email campaign, one or more email channel engines 151 can be employed. An email channel engines might include a dispatcher entity to manage the email channel execution. This entity (e.g., a process or thread) manages the work placed into a queue for processing by various personalization engines (PEs), possibly in conjunction with web services 158. An interactive template engine (ITE) can be employed by the personalization engine to perform the message personalization. The personalized emails are then sent to an email gateway to be processed for transmission to the campaign targets. A similar engine is provided for other channels such as the email channel engine $152_1$, mobile channel engine $152_2$, social channel engine $152_3$, display channel engine $152_4$, and web channel engine $152_5$.

In some embodiments, a gateway is provided to handle personalized messages for multiple ones of the channels rather than providing an individual gateway for each channel engine. In this approach, a common gateway comprises an extensible framework that permits messages to be provided to different channel destinations (e.g., using scripts that use a scripting language such as Javascript). This permits new channels to be implemented far more quickly, since an entire channel engine architecture does not need to be custom designed for the new channel. Instead, a generic channel engine can be implemented for messages to the common gateway, which are then provided in a customizable manner to the custom channel.

The program engine executes a business process workflow for any number of work items. Each workflow may have a number of different stages. In one embodiment, a stage is implemented as an abstract class that represents a component within the business process workflow. Examples of stages include an email campaign stage, a short message service (SMS) campaign stage, an elapsed timer campaign stage, a gateway (or "switch") campaign stage, or any other campaign stage. In some embodiments, different business logic may be associated with each of the different types of stages.

In some embodiments, a stage may include multiple "states" within the stage, and the multiple states can be described by a state transition diagram. A group of work items can be input into a given the stage. For example, a stage can include a ready state, a pending state, an executing state, a blocked state, a timer waiting state, and a disposable state. At the ready state, the group of work items is ready for execution of the stage. When a group of work items is initially created and the stage is the first stage of the business process workflow, the group is in a ready state. When an entire group of work items moves from a previous stage to a current stage together, the group is in a ready state. At the pending state, the stage is buffering membership and is not ready for execution. Once the previous stage has completed executing, the state of the group transitions to the ready state. At the executing state, the stage is executing on the group of work items. At the blocked state, the group of work items has failed execution, e.g., an error has occurred. After the executing state is complete, if additional stages exist in the business process workflow, then the group state transitions to the "ready state" for the next stage of the business process workflow. If no additional stages exist, then the group state transitions to the disposable state. A group of work items becomes disposable when the stage is the last stage of the business process workflow or when there are no subsequent stages. A "garbage collection" process can be scheduled to perform garbage collection at a low load time and can delete the group membership and group for this stage. The timer waiting state is associated with a stage that is an "elapsed time" stage having a future expiration date. Further details regarding an approach to implement business workflows are described in U.S. application Ser. No. 12/985,269, filed on Jan. 5, 2011, which is hereby incorporated by reference in its entirety.

An event manager mechanism (e.g., event processing engine 178) is employed to manage events in the system. For example, once the messages are sent by a gateway, an "event" is generated that is managed by the event processing engine. After the messages are sent, interactions may occur from various sources. For example, interactions may occur within the online world, such as when a receiver of an email message takes some sort of action, which action causes a next event. Such actions and/or events that are caused by the actions can be processed by various web services. Such web services can comprise, but are not limited to, publishing servers 159, web API servers 165, bounce servers 161, or cookie servers 162. Strictly as an example, when a targeted recipient receives an email from the campaign, that targeted recipient may open the email (e.g., from a client device such as a laptop computer, a smart phone, a tablet computer, etc.) and then take an action such as (1) reply to the message, (2) navigate to a website, (3) fill out a form, etc., any of which actions then cause a corresponding component from among the web services to generate a new event and to communicate aspects of the event to the event processing engine 178 in the system. The event manager therefore acts as a "listener" for the new events. A queue is maintained of the events in the system, with an event database to hold data pertaining to the events. One or more processing engines may be used to handle the events in the system.

The events may result in reporting of the event data such as through use of reporting tools 184 and/or through use of online analytical processing 182 (OLAP) systems. In addition, the event data can be stored into one or more data warehouses 180. From the data warehouse(s), data can be sent back to the customer database (e.g., so as to update the customer data for use in future campaigns). Servers such as the shown connect servers 170 can be used to pass data to and from the customer database. In some embodiments, the connect server receives data from partner and/or customer clouds (e.g., cloud 172₁, cloud 172₂) and performs extract, transform and load processing (ETL processing) before sending data to the customer database. Data can also be sent to/from partners' and customers' databases using any known-in-the-art technology.

Execution of marketing campaigns and, in particular, preparation of personalized emails is sensitive to dates (e.g., "As-Of" dates) and versions. As such, preparation of extremely large numbers of personalized emails using "As-Of" validity of data can be facilitated using caching subsystems. In some cases a least-recently-used cache (LRU cache) is sufficient for certain types of data, however both the performance and semantics of an "As-Of" cache are needed during the course of preparation of extremely large numbers of personalized emails.

FIG. 1D is a comparison chart 1D00 showing use of age-based policies when determining database cache hits or misses. Aspects of a least-recently-used cache include timestamping a data item as it is entered into a cache. On a data request for the cached item, the LRU cache is checked to determine if the requested data item is present in the cache. If so, and if the data item in the cache is deemed to be "fresh" or "not stale", then the requested data item is returned to the requestor. If the data item in the cache is deemed to be "not fresh" or "stale", then processing is initiated for handling a cache miss. In some systems, a caching system employs multiple levels or tiers of caches, and in such systems processing for handling a cache miss includes attempting retrieval from a next level cache.

Aspects of a cache that employs "As-Of" semantics include timestamping a data item based on a time and date as of retrieval from a database and/or based on a timestamp or other "As-Of" indication that is included in the item's metadata. On a data request for the cached item, the "As-Of" semantics check to determine if the requested data item is present in the cache. If so, the data item is further checked to determine if the data item is valid with respect to one or more age-based policies. If not, then processing is initiated for handling a cache miss. In such cases of a cache miss based on failing to identify a data item that is valid in accordance with one or more age-based policies, then processing is initiated to attempt retrieval directly from a database (e.g., without attempting retrieval from any next level cache tiers). This approach derives in part from the recognition that if a data item in cache is deemed to be not valid in accordance with the "As-Of" semantics, then an occurrence of any other copy of the data item in any other cache level(s) would also be deemed to be not valid in accordance with the same "As-Of" semantics. As such the requested data items is queried from the database without traversing multiple levels of cache.

As is now understood, the semantics pertaining to an age-based policy cache (e.g., using "As-Of" validity tests) are distinguished from the semantics of an LRU cache (e.g., using wall-clock time stamps and wall-clock validity tests).

FIG. 2 is a block diagram of a data delivery platform architecture 200 that observes age-based policies for determining database cache hits. As an option, one or more instances of data delivery platform architecture 200 or any aspect thereof may be implemented in the context of the architecture and functionality of the embodiments described herein. Also, the data delivery platform architecture 200 or any aspect thereof may be implemented in any desired environment.

Aspects of the data delivery platform architecture 200 are tuned to deliver very high levels of predictability, performance, availability, and scalability. The architecture includes one or more instances of an integrated data delivery platform 175 (IDDP), one or more instances of an interact data repository 176 (IDR), a metadata database 230, and a multi-level in-memory cache 204. The IDDP and IDR can be accessed and/or controlled through APIs. As shown, a lookup API 206 provides an interface to/from the IDDP, and a query API 208 provides an interface to the IDR. API calls to/from the IDDP or IDR can carry data objects or pointers to data objects. Strictly as one example, the lookup API 206 can receive objects comprising cache data updates 228. More particularly, operation of personalization applications 212, may receive data from customer databases, and may process such data from customer databases using the data delivery platform. During the course of personalization, the personalization applications may store and/or access data that is held in the multi-level in-memory cache 204. Data can also be stored and/or accessed by various data publishers. For example, and as shown, data publishers 166 can deliver published data 214 to the multi-level in-memory cache 204, and the data publishers 166 can deliver published metadata 216 to the metadata database 230.

The data delivery platform 174 can include any number of cache servers, and such cache servers can be comprised of servers built using commodity-hardware (e.g., Linux servers). The shown multi-level in-memory cache 204 can be a single memory cache, or can be distributed among a group of cache servers. The multi-level in-memory cache 204 can be populated with any partitioning of personalization data including personalization data pertaining to different campaigns. Such an architecture supports scalability to maintain a high number of concurrent lookups at high throughput with a predictable low millisecond response time, even as the number of concurrently in-process campaigns increases. This architecture supports a high volume of data inserts and updates from data publishers, as well as a volume of updates from applications. The approach can be scaled by adding cache servers as the number of concurrently in-process campaigns increases. In some implementations, each cache server has a respective hot standby server to facilitate system-wide high availability. Caches are persisted on local high-speed storage for fast startup after downtime and failure.

The shown metadata database comprises a highly-available transactional database of metadata to support atomicity, consistency, isolation, and durability (ACID). The metadata database stores campaign metadata published from customer databases, and can store live links as may be generated during execution of a marketing campaign. In some environments, the metadata dataset is small and can be contained in semiconductor memory for fast access.

As earlier indicated, the shown data publishers 166 publish content data and metadata to the data delivery platform. The data publishers can interface to customer databases and can be implemented as a Java application that publishes campaign personalization data pertaining to campaigns by retrieving data from customer databases and formatting (e.g., formatting into one or more tables) for delivery to the interact data delivery platform. In certain embodiments (e.g., such as in high availability installations), tables are published to both multiple cache servers (e.g., a pair of high-availability servers) in parallel. In some cases, publishing a table involves creating a corresponding optimized cache table, initially populating the cache table from the source table, continuously propagating source table changes to the cache table, and un-publishing the cache table when the table is no longer referenced by components involved in any in-progress campaign.

A metadata publisher propagates published campaign metadata to the metadata database and deletes or disables published metadata from the metadata database when a campaign is unpublished. A reverse replication process propagates live links from the metadata database to customer databases. A content publisher propagates published campaign content to the execution content store and purges published content not referenced by published campaigns. The customer databases can be populated from partner and/or customer data (e.g., from cloud $172_1$ and/or from cloud $172_2$). In some cases partner and/or customer data (e.g., from cloud $172_1$ and/or from cloud $172_2$) is queued into an update queue 222 before being populated into the customer databases.

The personalization applications 212 can include a wide variety of applications including launch applications, web channel publishing applications, and user interface (UI) applications. For campaign preview and test links, and for web channel publishing applications, a UI serves to read personalization data and campaign metadata from customer databases. Data updates received by web channel applications are queued to the customer database and eventually get published to the cache through the data publisher. In the interim (e.g., after data updates are received by web channel applications and before they get published to the cache), updates can be populated into multiple caches (e.g., on both the primary and hot standby servers) so that they are immediately available for access. These personalization applications 212 can comprise one or more personalization engine instances.

FIG. 3 is a block diagram of a personalization engine 300 comprising personalization applications that observe age-based policies for determining database cache hits. As an option, one or more instances of personalization engine 300 or any aspect thereof may be implemented in the context of the architecture and functionality of the embodiments described herein. Also, the personalization engine 300 or any aspect thereof may be implemented in any desired environment.

The personalization engine can be partitioned as a component embedded within a server application running on a server. In such a partition, the server application creates an instance of the engine (e.g., personalization engine instance 302) and calls the instance to personalize a message. In some cases the instance provides runtime services in the form of access through APIs (e.g., input API 304 and callback API 312). Data required for personalization (e.g., a document identifier 306 and a personalized message 308 within the personalization applications 212) can be pulled in in an on-demand basis, possibly through a data access service provider interface (SPI) (e.g., data access services 328, content access services 330, metadata access services 332, and distribution cache services 334) or through an API. Such a data access service provider or API can be implemented such that data access, content access, metadata access, caching, and/or other environment dependencies can be hidden from the personalization applications.

The personalization engine pulls content, metadata, and other data from the data delivery platform 174. The aforementioned callback APIs work in conjunction with services in the form of a content access callback 316, a metadata access callback 318 and/or a data access callback 314, as shown. The callback services rely on the IDDP to provide multi-level caching, for example, using an in-memory cache that has been populated with personalization data. In some cases, per-message session caches (e.g., see session caches 320) can be created within, or in conjunction with, the in-memory cache. For creating per message session caches, a personalization application 212 defines session caches to hold information specific to the message. Such information can include, but is not limited to, campaign data, runtime parameters, links, form access, triggered launch parameters, retrieved recipient key-value data, and segment group data. Recipient data fetched from key-based lookups and lookup records can also be cached in session caches.

The application maintains second-level LRU caches of campaign and related metadata, non-recipient data, and content (e.g., see L2 caches 322). Non-recipient specific data fetched through key-based lookups and lookup-table built-in queries are cached in L2 caches. For certain lookup-table queries, all fields of looked-up records are fetched and cached instead of single fields to satisfy multiple lookup-table queries of different fields of the same record without incurring multiple network calls.

As earlier indicated (see FIG. 2), campaign data from the customer is located in the customer database. This database includes information about the campaign, information about the recipients, and data about the products. Many tables of relational data may exist in the customer database. The data publishers take the customer data and publishes the data to the multi-level in-memory cache 204 via communication of cache data updates 228. A set of rules is implemented to define the workflows for extracting, transforming, and replicating the data to multiple target destinations.

To implement the campaign, a fast lookup is performed for profile data for the recipients to perform the personalization acts by the personalization applications. The in-memory cache includes a key-value store to hold data for the fast lookup. The relational data in the customer database can be converted into a key-value store to enable the fast look-up, e.g., as described in U.S. Pat. No. 8,775,448, issued on Jul. 8, 2014, which is hereby incorporated by reference in its entirety. Under certain circumstances, it may also be desirable to perform a search without using the key-value store (e.g., instead using a SQL query against relational data). Therefore, two types of APIs may be exposed, with one to perform key lookups and the other to perform a field lookup. Metadata is maintained in the metadata database to describe the data in the in-memory cache, e.g., to describe the schema of the key-value store.

Updates may occur to the customer data, e.g., where the recipient takes some action, for example though a web form. The updates can be queued (e.g., using the update queue 222) to make the updates to the customer database. The updates can also be made to the in-memory cache using cache data updates 228.

The data delivery platform is capable of performing in accordance with the following technical considerations:

- Campaign execution is isolated from design and data management activities. When execution is isolated from design and data management activities, this allows execution not to be impacted by design-time metadata and content changes and by design and data management workload.
- Provision of predictable and sustainable occurrence of low latency random reads. Random read data access with low latency (e.g., predictably less than 5 ms) to serve personalized web pages predictably (e.g., in less than 100 ms).
- Sustained high read throughput. Read data access supports a sustained bulk launch to permit, for example, throughput of 20,000 personalized messages per second.
- Continuous availability without downtime. The platform is available without downtime to respond to web requests and real-time messaging requests.
- Cost efficient linear scalability by horizontally scaling across commodity hardware and software.

Some embodiments of the disclosure comprise campaigns that are run in a dedicated high performance and high availability execution environment isolated from any impacts from design and data management activities such as activities to connect jobs and/or to perform filter queries, and is isolated from downtime of the design and data management environment. This means that campaigns rely on execution environment resources. In this approach, there is no dependency or limited dependency on customer databases and/or shared SAN storage.

When execution data is optimized for deterministic fast read access or for predictable fast access, general purpose SQL queries on arbitrary data source schemas are replaced by data access techniques that are optimized for lookups by the campaign (e.g., to accomplish deterministic and predictably fast random read accesses). Identifying the data sources used by a campaign requires parsing and analyzing the campaign metadata and its complete closure of content for database lookup built-ins.

In some embodiments, metadata, content, and data are published into the execution environment. Elements required by an executing campaign are published into the execution environment so that they are accessible on high performance and highly available platforms. Data publishers ensuring that only complete and valid campaigns become executable, that executable campaigns are shielded from design-time changes to metadata and content, and that all campaign dependencies are available in the execution environment. Once a data source is published into the execution environment, the published optimized version is continuously refreshed with updates from the customer database source data-source. Updates flow from the customer database to the execution environment.

In some embodiments, the execution data platform is an in-memory cache on shared cache servers. With compression, the working set of personalization data of accounts of a customer database can be held in memory. Each cache server has a dedicated loaded hot standby that applications can transparently failover to for uninterrupted service. For catastrophic failure of both the primary and standby cache servers, applications failover to the system-of-record customer databases.

The cached data may be durable. Cached data is persisted to local storage so that cache servers can quickly restart and become operational after downtime or failure. Persisted data is only read on startup. Writes to the cache do not need to be fully ACID so long as the persisted data is consistent; missing writes due to a server failure are refreshed from customer databases. A solution of asynchronous consistent background snapshots of the cache to storage would satisfy the durability requirement.

Cached data can be shared by accounts across commodity servers for horizontal scalability. Customer data is naturally separated by account with no sharing between accounts, and is relatively small. This separation is exploited by sharing accounts to different cache servers. The application platform handles account-based routing and failover.

Metadata can be published to an execution metadata database. Metadata from customer databases can be published to a highly available metadata database. Published metadata is read-only for use by campaign execution. Live link metadata generated during campaign execution is also stored in the metadata database and replicated to the customer databases for extract, transform, and load (ETL) processing to the data warehouse. Highly available read access is provided through multiple hot standby servers which allow applications to transparently failover reads to a standby server without interruption to service.

Content can be published to an execution content store. Content is published to a highly available execution content store so that it is separated from ad-hoc changes to content during design-time and is always available to executing campaigns. Initially this could simply be a separate tree on the shared file system to provide separation between published and unpublished content. In some cases, it can be a highly available high performance content management system.

Cached data can be accessed using key or field based lookups, rather than SQL, in some embodiments. There are two personalization data access use cases: recipient data lookup and built-in lookup. Recipient data lookup is the primary use case; it is typically a key-based lookup by record (RIID) using a technique that returns a single record of key-value pairs of recipient data. Built-in lookup is another use case. Built-in lookup comprises a field-based lookup over one or more fields. Built-in lookups can possibly return multiple records. More details regarding an approach to implement this aspect of the disclosure is described in U.S. Pat. No. 8,775,448, issued on Jul. 8, 2014, which is hereby incorporated by reference in its entirety.

In some embodiments, joins are disallowed, for example, where applications make multiple discrete lookups. Joins are not supported in the data cache. Instead of a joined profile view (JPV) that serves to present a view of multiple data sources so as to return a single recipient data record, the application makes multiple discrete lookups, one to each cached data source. Data cache implementations may support pipelining of lookups to reduce the number of round trips and improve throughput and overall latency. The performance viability of multiple discrete lookups is predicated on predictable low-latency lookups that an in-memory data cache and indexed cached data structures are intended to provide.

Data lookups can occur across different cache servers. Multiple lookups allow data to be retrieved from different servers. For example, externally provided content could be cached on a separate server with a separate lookup made to get the externally provided content. Or program transaction data could be looked up from a specialized low-latency on-line transaction processing (OLTP) program data store.

In some embodiments tables are publishable, whereas view data sources such as supplemental SQL views, join views, and filter views, are not publishable. Published dynamic-schema tables are transformed into static-schema cache tables. Customers define their table schema in the customer database with columns for each data field. They can dynamically change this schema at any time by adding, modifying, or removing data fields. To avoid locks and impact to lookup latency from dynamically altering cached data structures, published tables are transformed into static-schema cache tables. A cache table has an index column for each field that is used in a lookup, and a single value column containing the values of the remaining non-lookup fields, in compressed CSV format. If the published table has a primary key column, that column can be used as the primary key of the cache table. Once published the cache table schema is deemed to be fixed. This fixed schema supports modification to the schema of non-lookup fields in the source table as their fields are serialized into a single CSV string. If the customer changes the campaign to lookup the data source by new fields, the source table will need to be republished.

The data retriever 324 comprises a prefetch module 326 that fetches data from networked data stores and caches it locally in session or L2 caches depending on whether the data is recipient or non-recipient. The data retriever is called eagerly by the application to prefetch and cache recipient data prior to calling the engine, and is called lazily by the other components upon a cache miss. The fetch strategy is transparent to the engine which simply pulls data through a service provider interface (SPI). For bulk launch personalization, the retriever can prefetch for multiple recipients with a bulk lookup or pipelined lookups for high throughput.

Figure 4:
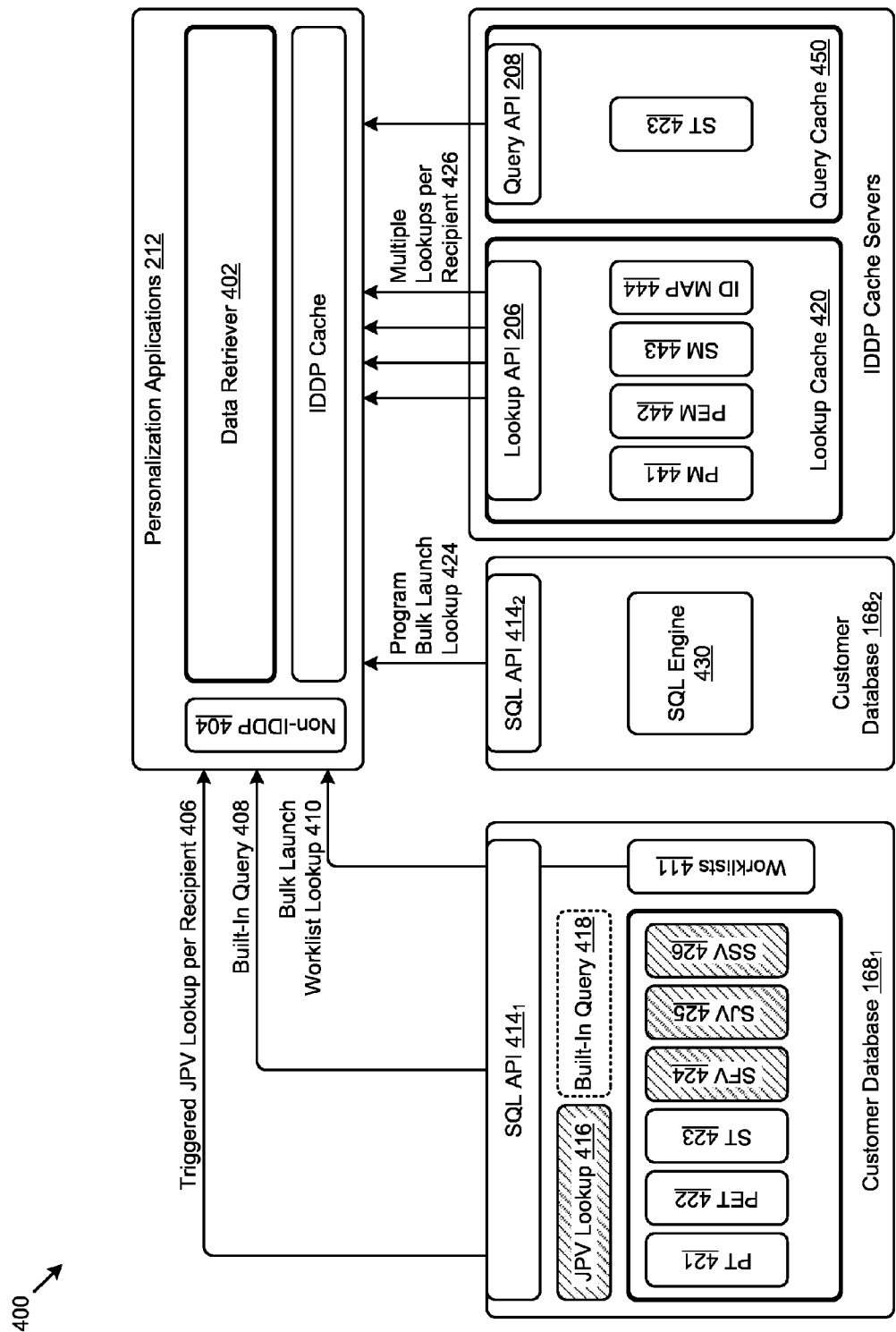
FIG. 4 depicts a data flow between personalization applications and cache servers that observe age-based policies for determining database cache hits, according to an embodiment.

FIG. 4 depicts a data flow 400 between personalization applications and cache servers that observe age-based policies for determining database cache hits. As an option, one or more instances of data flow 400 or any aspect thereof may be implemented in the context of the architecture and functionality of the embodiments described herein. Also, the data flow 400 or any aspect thereof may be implemented in any desired environment.

A multiple data source data retrieval approach is illustrated in FIG. 4. The data retriever 402 fetches data from different sources depending on whether the campaign is mapped onto the integrated data delivery platform or not. Such a mapping determination can be made based on (1) if data has been published to the IDDP cache, and (2) whether or not a failover condition exists. When a campaign is not mapped onto the integrated data delivery platform, a non-IDDP data access module 404 can be used. The non-IDDP data access module can receive data from triggered JPV lookups (see path 406, and see JPV lookup 416), and/or from queries to/from the customer database (see path 408 and see built-in query 418), and/or via a bulk launch worklist lookup (see path 410 and see worklists 411).

In this and other embodiments, and as pertains to data retrieval abstraction, the personalization applications are not concerned with details of the data source and the various routing, transformation, protocol, and failure handling logic. The data retriever provides a high-level API made accessible to the application, and the data retriever encapsulates storage access implementation details. Specifically, for backwards compatibility, failover, and lazy publishing, the data retriever encapsulates details including the status of whether it is accessing the IDDP cache servers or is accessing customer databases (e.g., through a non-IDDP data access module 404).

With regard to IDDP vs. non-IDDP campaigns, an IDDP campaign is any campaign created in an account that is enabled for IDDP and whose personalization data sources are not prohibited from being published to an IDDP. All other campaigns are non-IDDP campaigns. With regards to the IDDP cache as compared to the customer database (e.g., the shown customer database $168_2$), non-IDDP campaigns use the customer database (e.g., through SQL API $414_1$ or SQL API $414_2$ and using SQL engine 430) as the source of personalization data, whereas IDDP campaigns, with certain exceptions, use the cache server as the source of data. Access situations that can result in IDDP campaigns accessing the customer database rather than the IDDP are (a) access for preview, (b) access for retrieving unpublished data, and (c) access to customer transaction data.

A lookup cache 420 maps comprise tables declared as personalization data sources of an IDDP campaign include: the profile table (PT 421), 0 or more profile extension tables (PET 422), and 0 or more supplemental tables (ST 423). For published campaigns, each table has a corresponding key-value map in the lookup cache: profile map (PM 441), profile extension map (PEM 442), and supplemental map (SM 443). There are also multiple ID maps in the lookup cache (e.g., see ID Map 444) for mapping an email address, a mobile number, and a customer id to RIID. The query cache tables also comprise supplemental tables (ST 423) used as built-in data sources. They can be formed through a join or filter view of a published IDDP campaign and are replicated as needed to the query cache 450. These tables are indexed on the columns used as built-in query predicate fields, and indexed on join columns used by supplemental join views used by built-ins. For multiple lookups per recipient (e.g., for IDDP campaigns with multiple declared recipient data sources), there are multiple lookups of the c to retrieve the data for a single recipient, one per map for each declared data source. This is as opposed to a single lookup of the JPV view in the customer database. In addition to the aforementioned tables and maps, a customer database can be populated with a system filter view (SFV 424), a supplemental join view (SJV 425), a supplemental SQL view (SSV 426), as well as other views.

Figure 5:
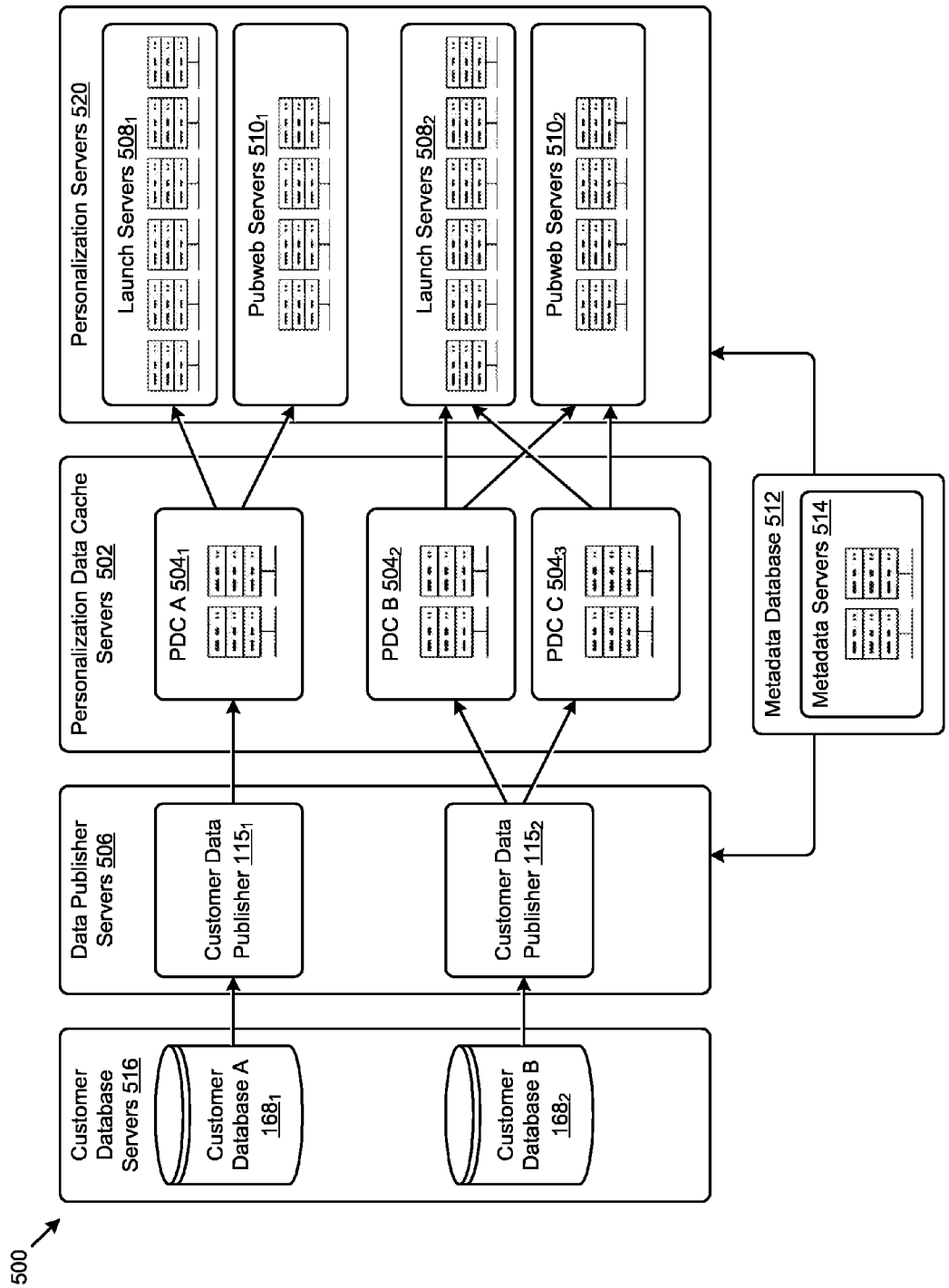
FIG. 5 depicts a server mapping for implementing marketing program systems in which one or more embodiments of the disclosure may be practiced.

FIG. 5 depicts a server mapping 500 for implementing marketing program systems in which one or more embodiments of the disclosure may be practiced. As an option, one or more instances of server mapping 500 or any aspect thereof may be implemented in the context of the architecture and functionality of the embodiments described herein. Also, the server mapping 500 or any aspect thereof may be implemented in any desired environment.

The embodiment shown in FIG. 5 includes a collection of personalization data cache servers 502, which in turn comprises personalization data cache server PDC_A $504_1$, personalization data cache server PDC_B $504_2$, and personalization data cache server PDC_C $504_3$. Any servers from among the collection of personalization data cache servers can receive inputs from any one or more from among the shown collection of data publisher servers 506. The shown collection of data publisher servers includes customer data publisher $115_1$ and customer data publisher $115_2$, any of which can receive inputs from customer database servers 516.

As can be understood any server or servers downstream from the personalization data cache servers 502 can access data from a cache, rather than from the customer databases. For example, a collection of personalization servers 520 often includes one or more launch servers (e.g., launch server 508₁, launch server 508₂), and one or more publication servers (e.g., pubweb server 510₁, pubweb server 510₂).

The pubweb servers listen for HTTP requests from "click-through" events and initiate other actions on the basis of receiving the event. For example, a pubweb server can initiate the formation of links that are in turn sent out in messages for highly-targeted campaigns. The link that is clicked on by a recipient can cause a web page to be displayed in the user's browser. As such the web page(s) can be personalized. Pubweb servers are situated in the environment so as retrieve data from the personalization data cache servers.

Any server anywhere and/or in any collection of servers can access the metadata database 512, which may be implemented using one or more metadata servers 514.

The shown mapping is purely exemplary, and other mappings or variations are possible. In some cases, a particular server is configured as an application server to access a query server, and a personalization data cache server is configured as a personalization data cache server.

Figure 6:
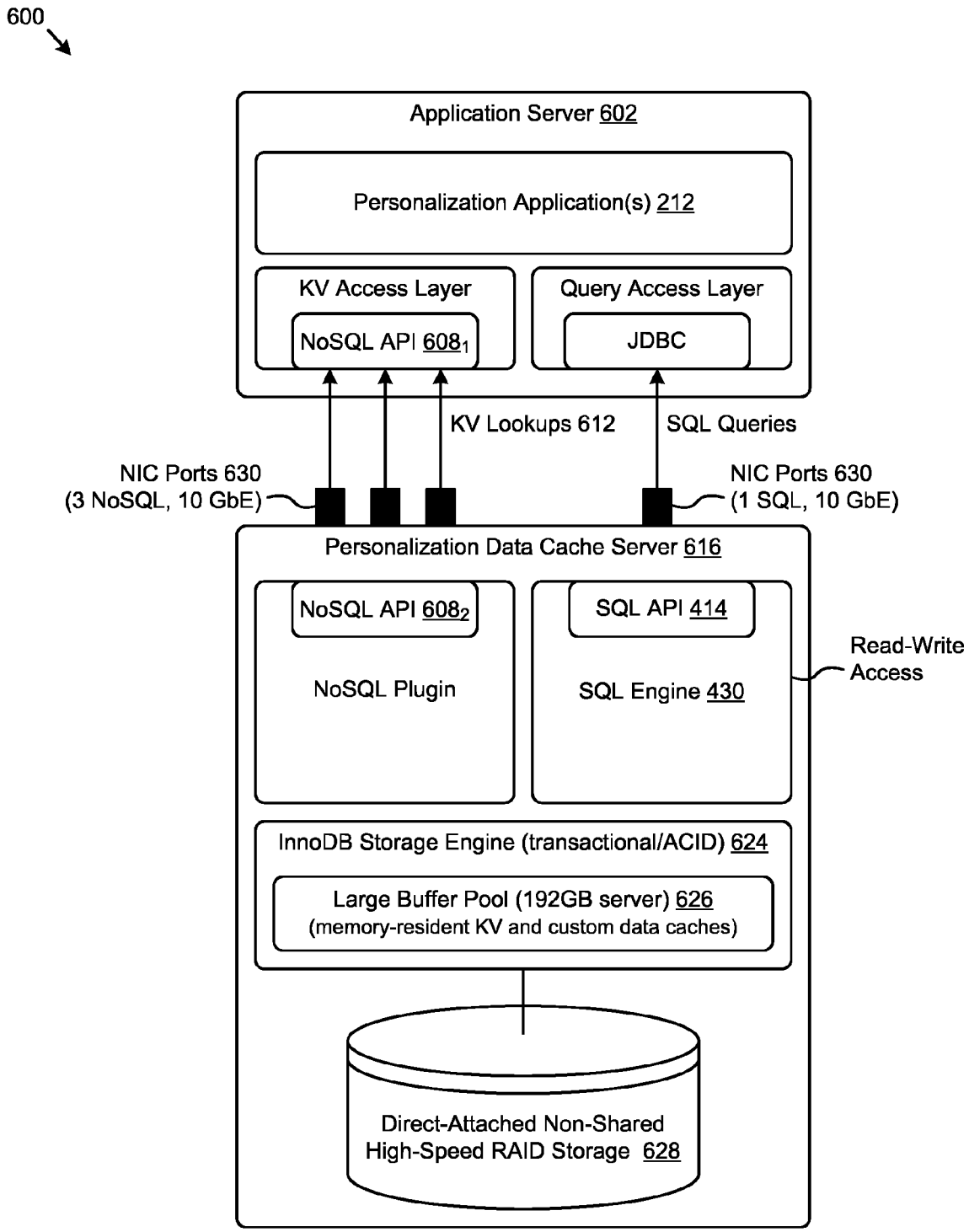
FIG. 6 presents a data cache architecture within which one or more embodiments of the disclosure may be practiced.

FIG. 6 presents a data cache architecture 600 within which one or more embodiments of the disclosure may be practiced. As an option, one or more instances of data cache architecture 600 or any aspect thereof may be implemented in the context of the architecture and functionality of the embodiments described herein. Also, the data cache architecture 600 or any aspect thereof may be implemented in any desired environment.

As earlier indicated, the data cache can be implemented using any suitable data caching system. In some embodiments, the data cache is implemented using a fast query server that offers many benefits including a high-performance APIs (e.g., NoSQL API 608₁, NoSQL API 608₂,) that offers interfaces directly to the InnoDB storage engine 624, thus bypassing the overhead of a SQL API 414 and SQL engine 430. In some cases, and as shown, the InnoDB storage engine 624 includes a large buffer pool 626 in front of an array of high-speed RAID storage 628.

In some deployments, performance is facilitated by use of multiple high-speed (e.g., 10 Gbps) Ethernet ports (e.g., NIC ports 630). Key value lookups 612 can be accomplished at a rate of over 750 queries per second, whereas deployments with fewer ports might support a lesser rate of queries per second. In one approach, the high-performance pairing between at least one application server 602 and at least one personalization data cache server 616 can be instantiated within a system, such as is shown and described as pertains to FIG. 2, so as to implement a high-performance data cache.

Figure 7:
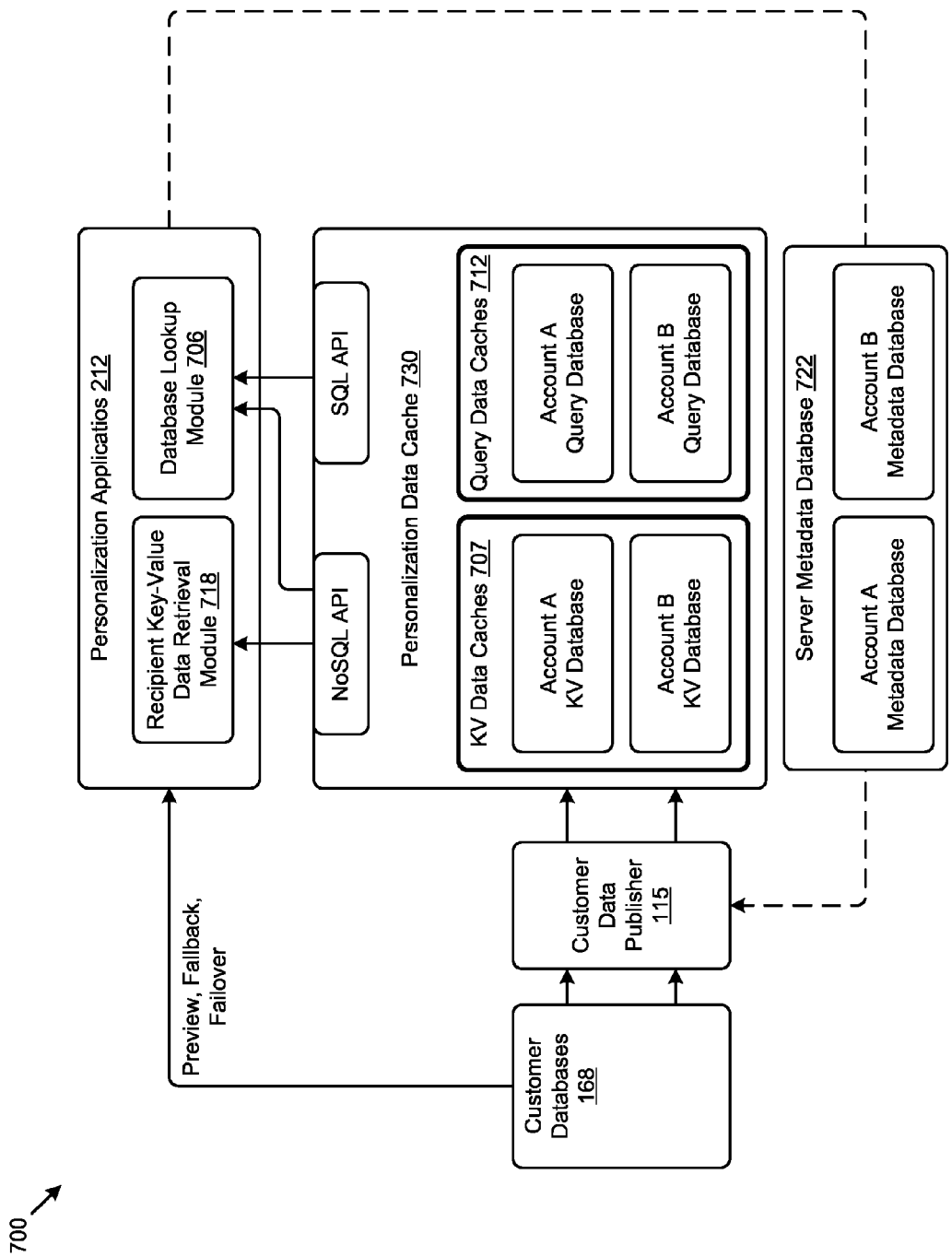
FIG. 7 illustrates a data cache access approach used by personalization applications to observe age-based policies for determining database cache hits, according to an embodiment.

FIG. 7 illustrates a data cache access approach 700 used by personalization applications to observe age-based policies for determining database cache hits. As an option, one or more instances of data cache access approach 700 or any aspect thereof may be implemented in the context of the architecture and functionality of the embodiments described herein. Also, the data cache access approach 700 or any aspect thereof may be implemented in any desired environment.

A data cache can be implemented using any suitable data system. In some embodiments, a server or collection of servers such as the shown personalization data cache 730 implements the data cache. The data cache includes key-value data caches (e.g., KV data caches 707) and query data caches (e.g., query data cache 712). Additionally, such a data cache can be advantageously accessed by personalization applications and/or their constituent components such as a recipient key-value data retrieval module 718 and/or a database lookup module 706.

Any of the aforementioned components or applications can be configured to supply age-based policies that are used (e.g., see personalization data cache 730, and see server metadata database 722) for determining database cache hits in accordance with the age-based policies. Moreover, the architecture underlying the data cache access approach 700 can be mapped into a high-availability configuration.

Figure 8:
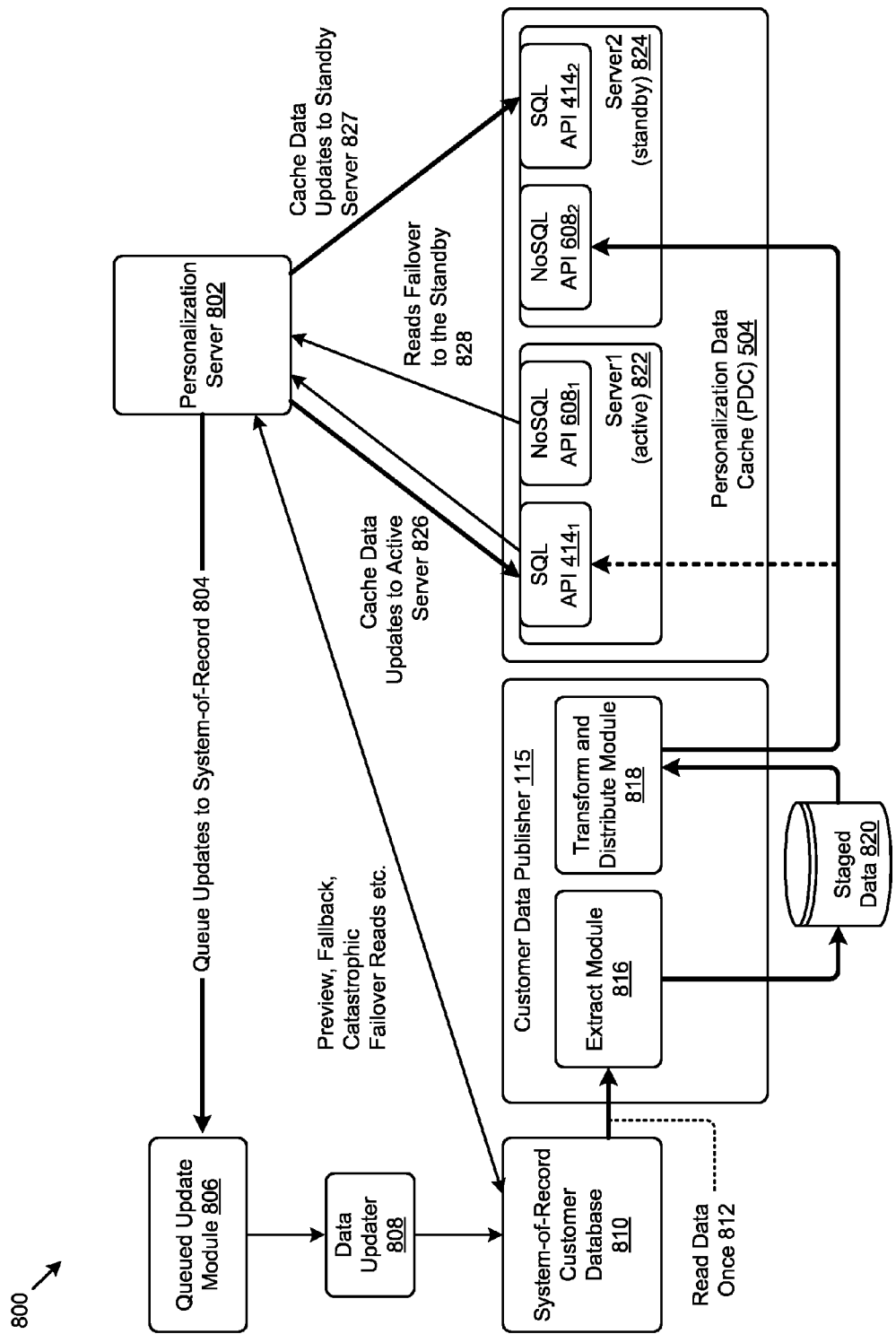
FIG. 8 illustrates a high-availability personalization data cache in which one or more embodiments of the disclosure may be practiced.

FIG. 8 illustrates a high-availability personalization data cache 800 in which one or more embodiments of the disclosure may be practiced. As an option, one or more instances of a high-availability personalization data cache 800 or any aspect thereof may be implemented in the context of the architecture and functionality of the embodiments described herein. Also, the high-availability personalization data cache 800 or any aspect thereof may be implemented in any desired environment.

As previously noted, high availability can be provided in some embodiments of the disclosure. FIG. 8 illustrates an approach to implement high availability. This is provided, for example, by publishing to a standby server. Reading can occur from the active server.

Referring to the flow stemming from the system-of-record customer database 810, a high availability version of the customer data publisher 115 can read data (e.g., see path to read data once 812), and then commence to extract data (see extract module 816), store it to a location for staged data 820, which staged data is, in turn, read by a transform and distribute module 818. The aforementioned operations can occur while a PDC server 504 is in active operation. Meanwhile, one or more instances of personalization server 802 operates to avoid contention with any data publisher(s). Further, the one or more instances of personalization servers can provide functions such as previews, fallback, and failover reads. The PDC servers 504 host both an "active" server1 822 and a "standby" server2 824. Data from the staged data is distributed to the "active" sever and "standby" server at the election of the transform and distribute module 818. Cache data is updated to the active server (see path 826) concurrently with cache data being updated to the standby server (see path 827). The cache data being updated to the standby server can derive from activity at the active server (see path 826). Activity that results in changes to be reflected in the system-of-record are queued (see message 804), and a queued update module 806 in conjunction with a data updater 808 handles applying changes to the customer database. Additionally, there is a path 828 to perform reads in a failure scenario. For example, the path 828 serves to process reads during failover scenarios. Such reads can be directed to the active server, or to the standby server. Not only in failure scenarios but also is other scenarios, the aforementioned paths serve for accessing the database to retrieve a stored instance of the data item (e.g., when a cutoff policy is not met).

Figure 9:
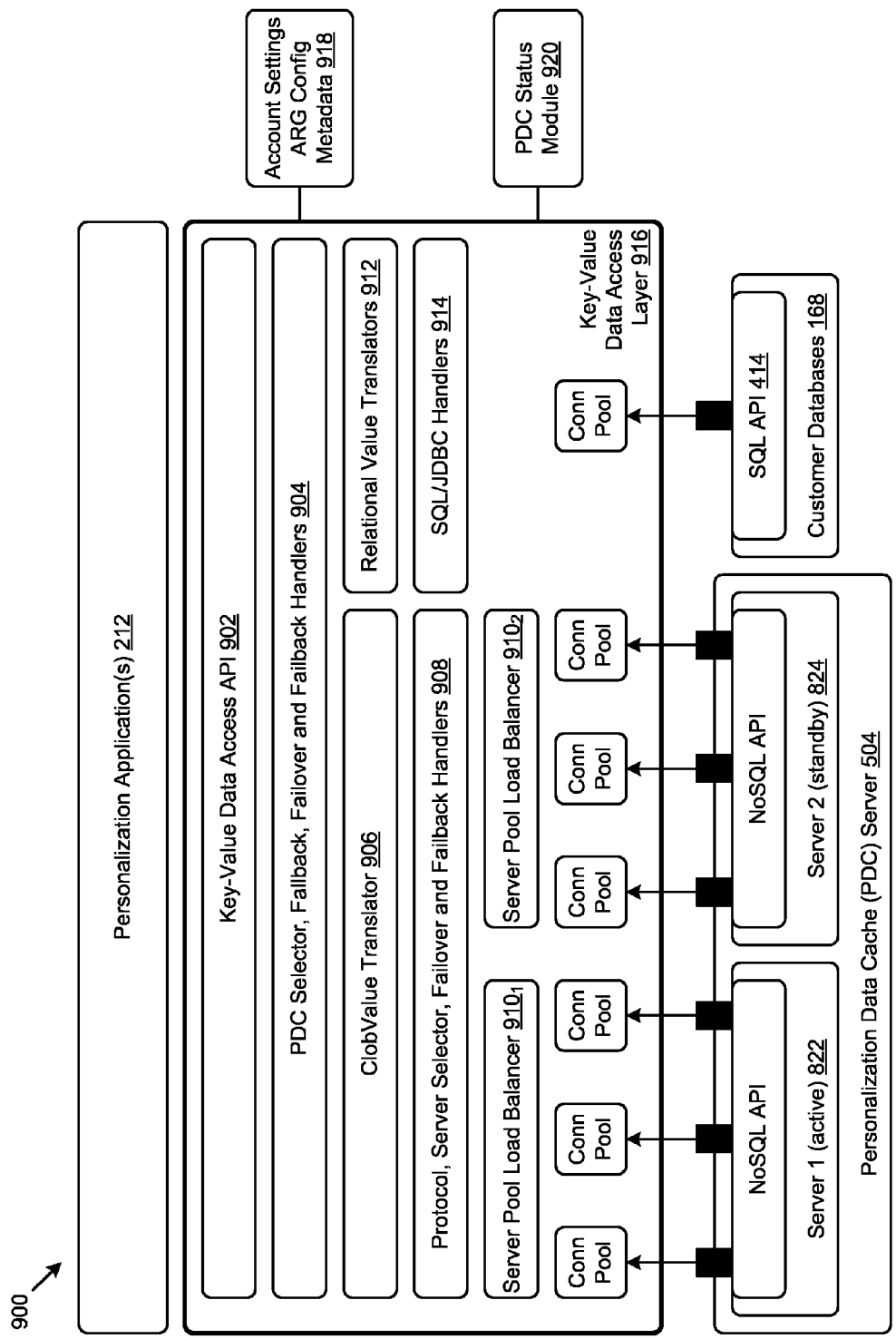
FIG. 9 depicts a parallel access personalization data cache use model within which one or more embodiments of the disclosure may be practiced.

FIG. 9 depicts a parallel access personalization data cache use model 900 within which one or more embodiments of the disclosure may be practiced. As an option, one or more instances of parallel access personalization data cache use model 900 or any aspect thereof may be implemented in the context of the architecture and functionality of the embodiments described herein. Also, the parallel access personalization data cache use model 900 or any aspect thereof may be implemented in any desired environment.

Cached data can be accessed using key or field based lookups. These data access use cases do not expose SQL query semantics and do not require a SQL solution. FIG. 9 illustrates an approach that can be taken to implement key-value lookups according to some embodiments of the disclosure. In this particular embodiment, personalization applications 212 communicate with a PDC server 504 through a specialized key-value data access API. The key-value data access layer 916 can be configured through use of metadata, which metadata can be derived from account settings (see module 918). Real-time or near real-time status of the PDC server can be reported using a PDC status module 920.

Access by the personalization applications 212 is provided by a key-value data access API 902, which in turn interfaces with specialized handlers (e.g., PDC selector handlers 904, and protocol handlers 908), specialized "character large object value" translators (e.g., clobvalue translators 906, as shown), relational value translators 912, load balancers (e.g., load balancer $910_1$, load balancer $910_2$), and SQL/JDBC handlers 914. The clobvalue translators 906 are configured to process character-oriented large objects (CLOBs). CLOBs comprise character data that can be stored in a database. The contents of CLOBs are sometimes stored in a table, or sometimes stored in one or more separate locations, which location can be codified such that the location can be identified in a database table. It is a collection of character data in a database, sometimes stored in a separate location that is referenced in the table itself.

Figure 10:
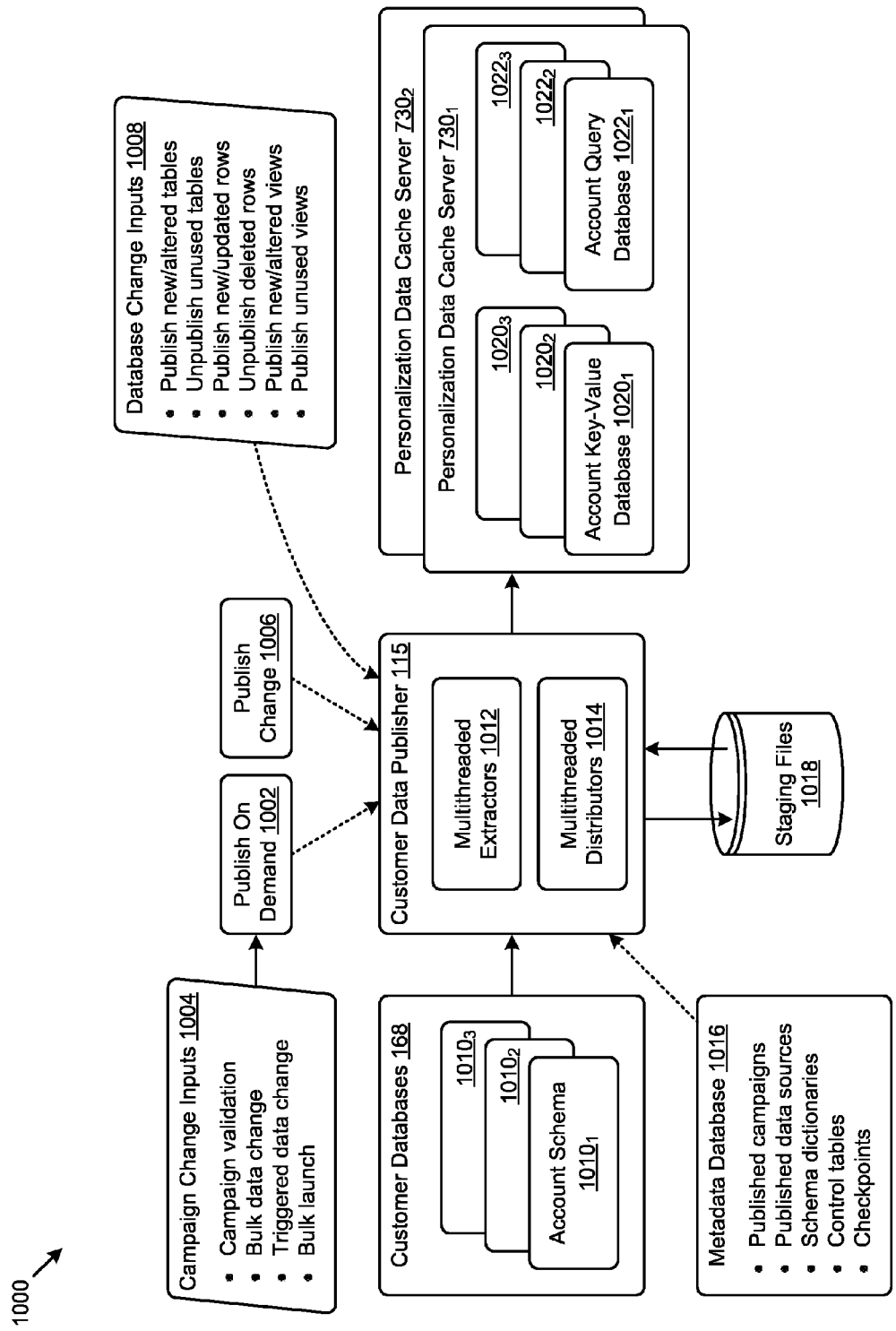
FIG. 10 depicts a personalization data cache population approach as used to implement age-based policies for determining database cache hits, according to some embodiments.

FIG. 10 depicts a personalization data cache population approach 1000 as used to implement age-based policies for determining database cache hits. As an option, one or more instances of personalization data cache population approach 1000 or any aspect thereof may be implemented in the context of the architecture and functionality of the embodiments described herein. Also, the personalization data cache population approach 1000 or any aspect thereof may be implemented in any desired environment.

FIG. 10 illustrates an approach that can be taken to allow customer data to be published on demand. In this approach, the data publisher comprises extractors and distributors that allow for customer data including data from the customer database, as well as a metadata database, to be published on demand (e.g., see campaign change inputs 1004).

The shown publish on demand module 1002 implements a set of rules to define the workflows provided to an instance of a customer data publisher, where the rules and workflows serve for extracting (see multi-threaded extractors 1012), transforming, and distributing the data to multiple target destinations (see multi-threaded distributors 1014). It is noted that the data models (e.g., account schemas $1010_1$, account schemas $1010_2$, account schemas $1010_3$, etc.) used in a customer database may change; moreover there may be ongoing changes to database contents (e.g., see database change inputs 1008). The data publisher should be able to detect changes in the data model, and to appropriately send data to the data store as a result. Rules can be configured to implement this functionality. A database of campaign metadata 1016 holds historical and/or currently-in-prosecution campaign data so as to facilitate of changes in the customer database. In some cases the determination of a change in a customer database requires accessing multiple data sources; accordingly, a storage for staging files 1018 is made accessible to the customer data publisher.

Instances of a customer data publisher 115 interacts with instances of a PDC server (see PDC server $730_1$, and PDC server $730_2$), which in turn serve to manage occurrences of account key-value databases (see account KV database $1020_1$, account KV database $1020_2$, account KV database $1020_3$, etc.) and which customer data publisher instances further serve to manage occurrences of account query databases (see account query database $1022_1$, account query database $1022_2$, account query database $1022_3$, etc.).

Numerous use cases can be implemented with embodiments of the disclosure, which may have different notions of what is consistent and up-to-date data. Some embodiments pertain to the idea of how the cache clients and the cache server work in collaboration to maximize the cache hits while still serving consistent data. As mentioned earlier, the cache server has metadata that determines how recent or up-to-date the cache data is with respect to the master database. Changes can be published as the changes are recognized (see publish change module 1006).

In some embodiment, the clients can also pass in an "AsOfTime" value/parameter when they perform the data lookups against the cache. Because the client has the best knowledge of what snapshot of the data is acceptable from the data recency perspective, they pass that information when they request the lookups. The cache serves the requests only if it can honor the "AsOfTime".

Figure 11:
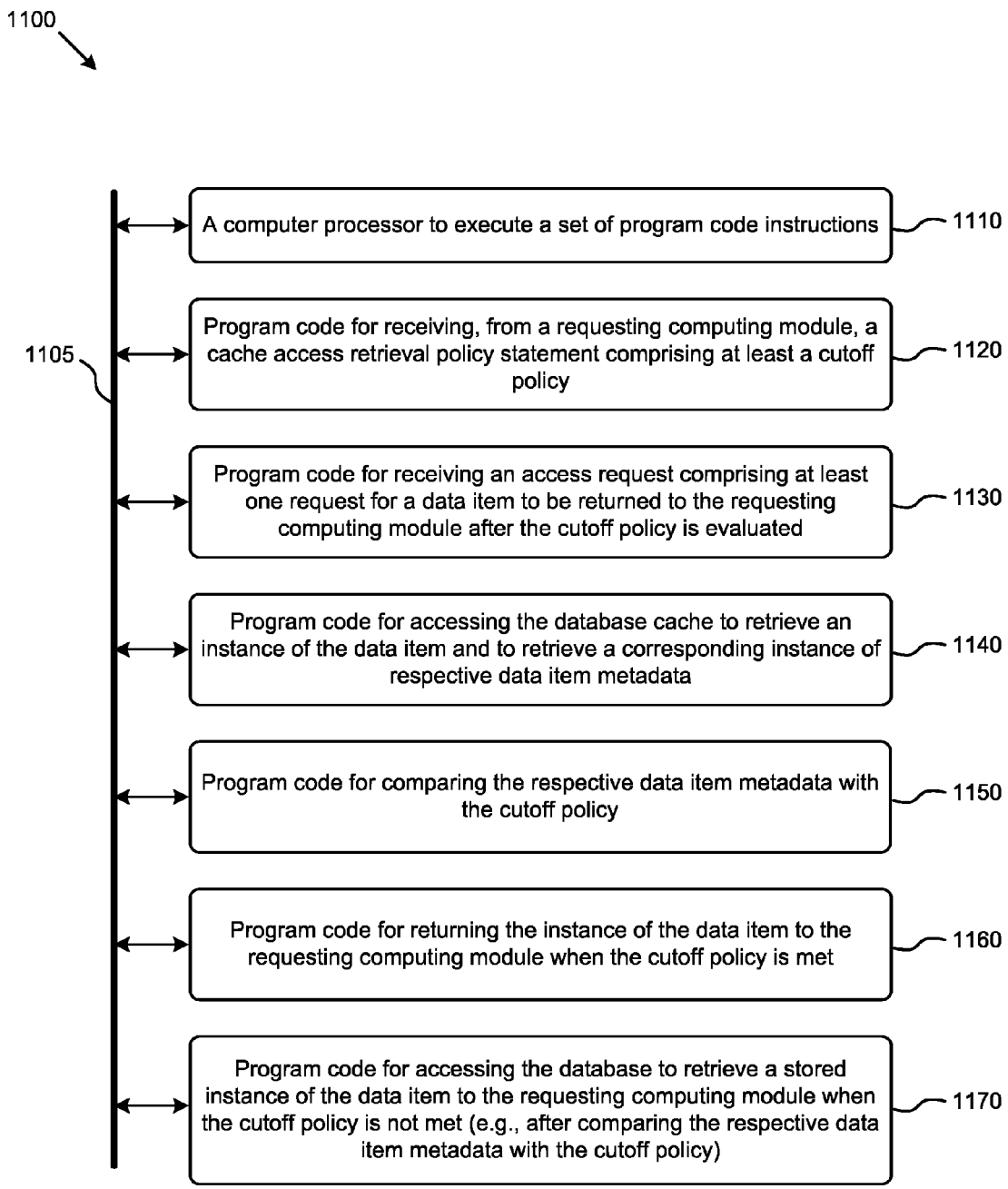
FIG. 11 depicts system components as arrangements of computing modules that handle cache accesses when observing age-based policies for determining database cache hits, according to an embodiment.

FIG. 11 depicts system components as arrangements of computing modules that handle cache accesses when observing age-based policies for determining database cache hits. As an option, the present system 1100 may be implemented in the context of the architecture and functionality of the embodiments described herein. Of course, however, the system 1100 or any operation therein may be carried out in any desired environment. The system 1100 comprises at least one processor and at least one memory, the memory serving to store program instructions corresponding to the operations of the system. As shown, an operation can be implemented in whole or in part using program instructions accessible by a module. The modules are connected to a communication path 1105, and any operation can communicate with other operations over communication path 1105. The modules of the system can, individually or in combination, perform method operations within system 1100. Any operations performed within system 1100 may be performed in any order unless as may be specified in the claims. The shown embodiment implements a portion of a computer system, presented as system 1100, comprising a computer processor to execute a set of program code instructions (see module 1110) and modules for accessing memory to hold program code instructions to perform: receiving, from a requesting computing module, a cache access retrieval policy statement comprising at least a cutoff policy (see module 1120); receiving an access request comprising at least one request for a data item to be returned to the requesting computing module after the cutoff policy is evaluated (see module 1130); accessing the database cache to retrieve an instance of the data item and to retrieve a corresponding instance of respective data item metadata (see module 1140); and comparing the respective data item metadata with the cutoff policy (see module 1150). As shown, the system further comprises returning the instance of the data item to the requesting computing module when the cutoff policy is met (see module 1160). In some cases, a module (see module 1170) serves for accessing the database to retrieve a stored instance of the data item to the requesting computing module when the cutoff policy is not met (e.g., after comparing the respective data item metadata with the cutoff policy).

The arrangement of system components of FIG. 11 is merely one example. Other implementations begin by receiving a lookup request for data in a cache server. An "As-Of" indication can be in the form of an "AsOfTime"

indication or an "AsOfVersion" indicator, or any other "As-Of" indication as is supported by the syntax and semantics of any particular implementation of an "As-Of" cutoff 141, and/or a cutoff type 142, and/or a threshold value 143, and/or any other metadata or aspect of data item metadata fields.

In one particular flow, an identification is made of the "As-Of" lookup request. This parameter is accessed, for example, by receiving "As-Of" indications and related values from over a network. Next, the lookup request is checked against the policy statement parameters to check whether the request is valid in light of the "As-Of" indication. If so, then the request is serviced from the cache server. If not, then the process queries the master database. The following are some example implementations according to embodiments of the disclosure.

Implementation 1

One common way that marketers can use the system is to upload personalization data into the master database, and then perform a bulk launch for targeted recipients. In this case, the launch start time is used for the snapshot when determining the data recency for doing cache lookups. For example, it is conceivable that the data in the master can be modified right after the launch start time, and it may not be able to sync the cache data with these changes. But when the personalization data is looked up during the launch, as long as the data that is in cache is recent as of the launch start time (e.g., as determined from respective personalization data metadata), the cached data can be used. Otherwise, the lookups fallback to the master database.

Implementation 2

The message sent as part of the bulk launch may contain links to web pages. When the end user clicks the link, the web page is served with the recipient personalization data. Here again, the link will store the "AsOfTime" that corresponds to the start time of the bulk launch. So, when the web page is personalized, the cache serves the lookup requests only if the cache data is up-to-date as of the requested time.

Implementation 3

Typically, marketers want to preview the message before they initiate the launch that could be targeted to several recipients (e.g., millions of recipients). In the case involving such a preview, one may not wish to use the cached data. In this situation, "AsOfTime" will be set to the "LATEST", and then lookups always fall back to the master database.

Implementation 4

A personalized message is sent to a single recipient that is the result of a web form submission. In this case, a user may input some data, and when the user submits the data, it may result in a personalization message being sent to that user. The message could have, for example, links to web pages. There are multiple possible use cases here. When the message is personalized, there may be a need to use the "LATEST" for "AsOfTime" since one may not expect the cache to be synchronized in real time. However, the links or a portion of web page link could also use the "AsOfTime" that corresponds to when the message is generated. There is typically enough delay between the time the message is generated, and the time the user clicks the link in the message. As long as the data item in cache (e.g., a coupon link) is recent as of the time the message is generated, web page personalization that happens when the user clicks the link will use the cached data.

Implementation 5

There are cases where a marketer may not care about the "As-Of" nature of a data lookup. In such cases, the "As-Of" fields and/or any respective age-based policy statements can be null. In such cases lookups are made to the cache (and to the database in the case of a cache miss) and returned to the caller irrespective of the data age or cache recency.

Additional Embodiments of the Disclosure

Additional Practical Application Examples

Figure 12A:
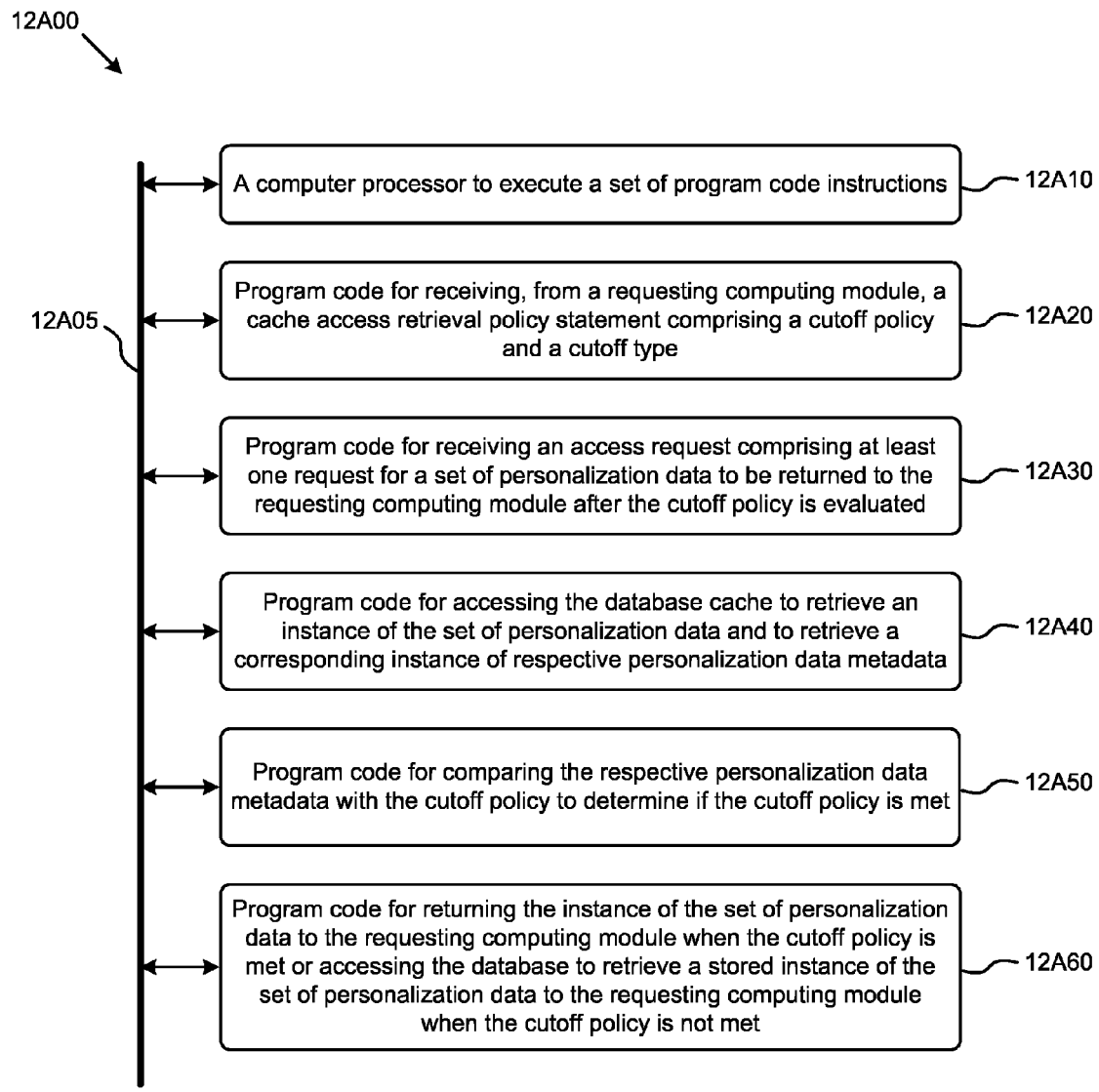
FIG. 12A and FIG. 12B depict system components as arrangements of computing modules that are interconnected so as to implement certain of the herein-disclosed embodiments.

FIG. 12A depicts a system 12A00 as an arrangement of computing modules that are interconnected so as to operate cooperatively to implement certain of the herein-disclosed embodiments. The partitioning of system 12A00 is merely illustrative and other partitions are possible. As an option, the present system 12A00 may be implemented in the context of the architecture and functionality of the embodiments described herein. Of course, however, the system 12A00 or any operation therein may be carried out in any desired environment. The system 12A00 comprises at least one processor and at least one memory, the memory serving to store program instructions corresponding to the operations of the system. As shown, an operation can be implemented in whole or in part using program instructions accessible by a module. The modules are connected to a communication path 12A05, and any operation can communicate with other operations over communication path 12A05. The modules of the system can, individually or in combination, perform method operations within system 12A00. Any operations performed within system 12A00 may be performed in any order unless as may be specified in the claims. The shown embodiment implements a portion of a computer system, presented as system 12A00, comprising a computer processor to execute a set of program code instructions (see module 12A10) and modules for accessing memory to hold program code instructions to perform: receiving, from a requesting computing module, a cache access retrieval policy statement comprising a cutoff policy and a cutoff type (see module 12A20); receiving an access request comprising at least one request for a set of personalization data to be returned to the requesting computing module after the cutoff policy is evaluated (see module 12A30); accessing the database cache to retrieve an instance of the set of personalization data and to retrieve a corresponding instance of respective personalization data metadata (see module 12A40); comparing the respective personalization data metadata with the cutoff policy to determine if the cutoff policy is met (see module 12A50); returning the instance of the set of personalization data to the requesting computing module when the cutoff policy is met or accessing the database to retrieve a stored instance of the set of personalization data to the requesting computing module when the cutoff policy is not met (see module 12A60).

Figure 12B:
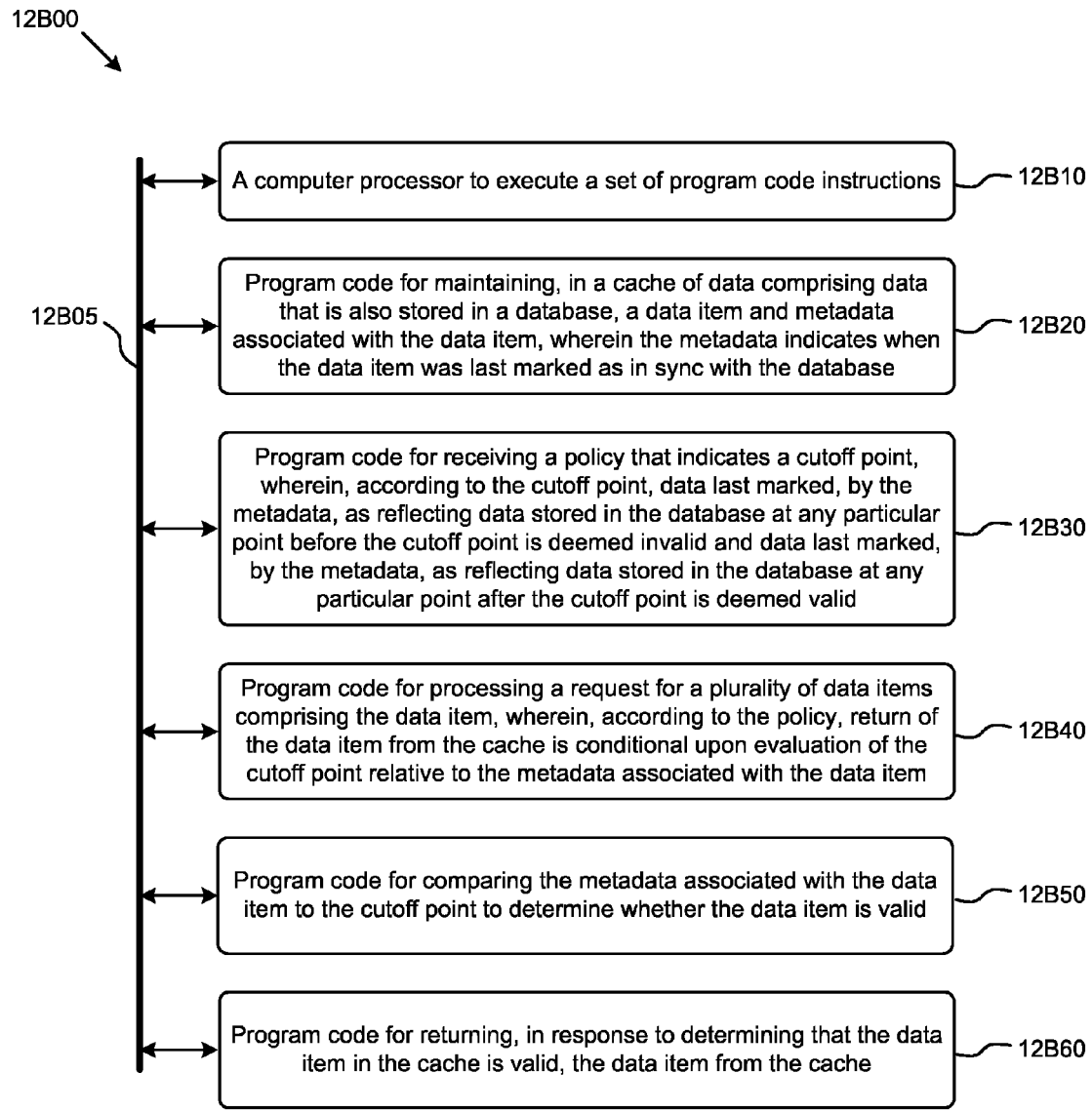

FIG. 12B depicts a system 12B00 as an arrangement of computing modules that are interconnected so as to operate cooperatively to implement certain of the herein-disclosed embodiments. As an option, the present system 12B00 may be implemented in the context of the architecture and functionality of the embodiments described herein. Of course, however, the system 12B00 or any operation therein may be carried out in any desired environment. The system 12B00 comprises at least one processor and at least one memory, the memory serving to store program instructions corresponding to the operations of the system. As shown, an operation can be implemented in whole or in part using program instructions accessible by a module. The modules are connected to a communication path 12B05, and any operation can communicate with other operations over communication path 12B05. The modules of the system can, individually or in combination, perform method operations within system 12B00. Any operations performed within system 12B00 may be performed in any order unless as may be specified in the claims. The shown embodiment implements a portion of a computer system, presented as system 12B00, comprising a computer processor to execute a set of program code instructions (see module 12B10) and modules for accessing memory to hold program code instructions to perform: maintaining, in a cache of data comprising data that is also stored in a database, a data item and metadata associated with the data item, wherein the metadata indicates when the data item was last marked as in sync with the database (see module 12B20); receiving a policy that indicates a cutoff point, wherein, according to the cutoff point, data last marked, by the metadata, as reflecting data stored in the database at any particular point before the cutoff point is deemed invalid and data last marked, by the metadata, as reflecting data stored in the database at any particular point after the cutoff point is deemed valid (see module 12B30); processing a request for a plurality of data items comprising the data item, wherein, according to the policy, return of the data item from the cache is conditional upon evaluation of the cutoff point relative to the metadata associated with the data item (see module 12B40); comparing the metadata associated with the data item to the cutoff point to determine whether the data item is valid (see module 12B50); and in response to determining that the data item in the cache is valid, returning the data item from the cache (see module 12B60).

System Architecture Overview

Additional System Architecture Examples

Figure 13A:
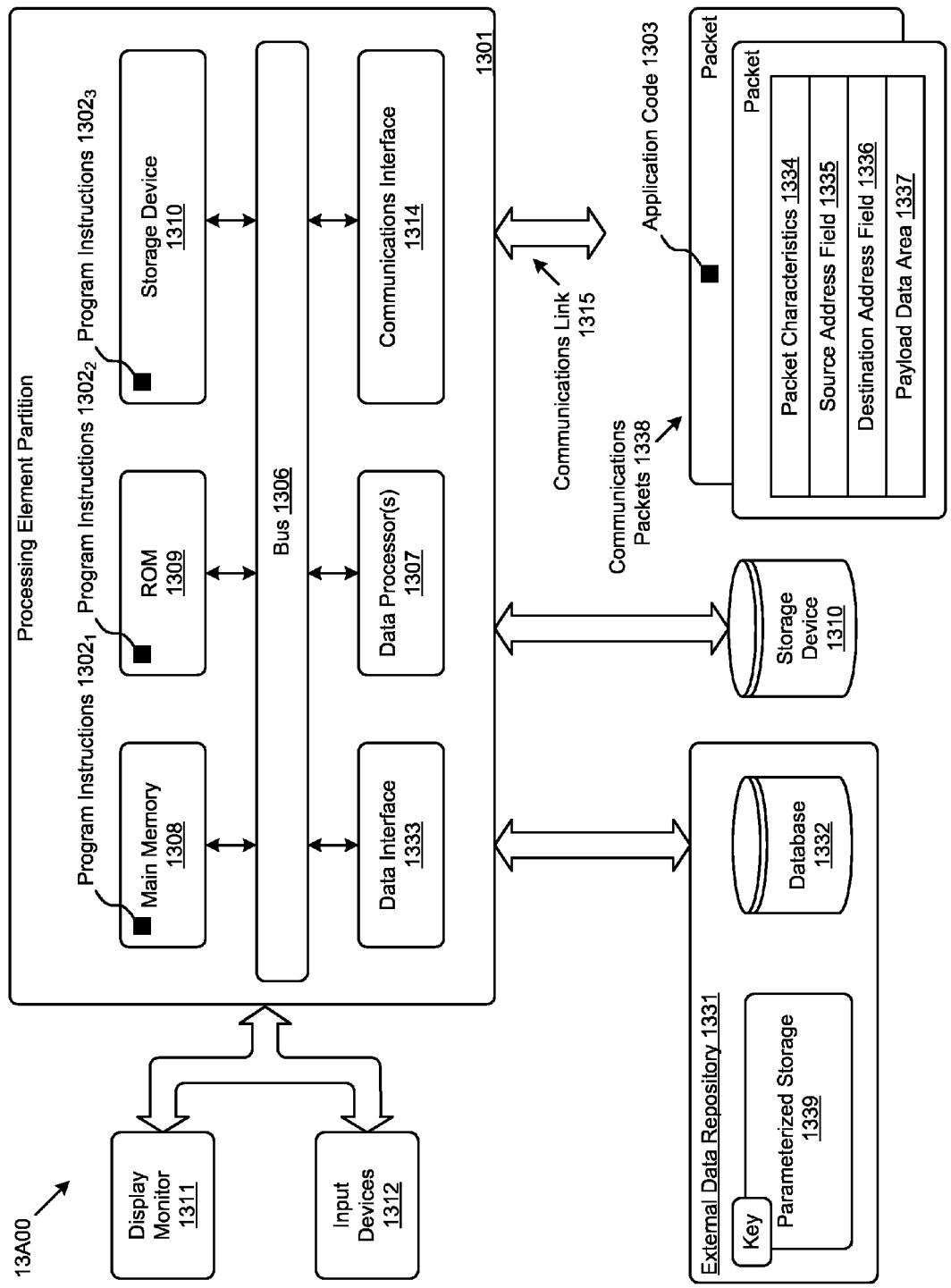
FIG. 13A, FIG. 13B, and FIG. 13C depict exemplary architectures of components suitable for implementing embodiments of the present disclosure, and/or for use in the herein-described environments.

FIG. 13A depicts a block diagram of an instance of a computer system 13A00 suitable for implementing embodiments of the present disclosure. Computer system 13A00 includes a bus 1306 or other communication mechanism for communicating information. The bus interconnects subsystems and devices such as a CPU, or a multi-core CPU (e.g., processor 1307), a system memory (e.g., main memory 1308, or an area of random access memory RAM), a non-volatile storage device or non-volatile storage area (e.g., ROM 1309), an internal or external storage device 1310 (e.g., magnetic or optical), a data interface 1333, a communications interface 1314 (e.g., PHY, MAC, Ethernet interface, modem, etc.). The aforementioned components are shown within processing element partition 1301, however other partitions are possible. The shown computer system 13A00 further comprises a display 1311 (e.g., CRT or LCD), various input devices 1312 (e.g., keyboard, cursor control), and an external data repository 1331.

According to an embodiment of the disclosure, computer system 13A00 performs specific operations by processor 1307 executing one or more sequences of one or more program code instructions contained in a memory. Such instructions (e.g., program instructions $1302_1$, program instructions $1302_2$, program instructions $1302_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 13A00 performs specific networking operations using one or more instances of communications interface 1314. Instances of the communications interface 1314 may comprise one or more networking ports that are configurable (e.g., pertaining to speed, protocol, physical layer characteristics, media access characteristics, etc.) and any particular instance of the communications interface 1314 or port thereto can be configured differently from any other particular instance. Portions of a communication protocol can be carried out in whole or in part by any instance of the communications interface 1314, and data (e.g., packets, data structures, bit fields, etc.) can be positioned in storage locations within communications interface 1314, or within system memory, and such data can be accessed (e.g., using random access addressing, or using direct memory access DMA, etc.) by devices such as processor 1307.

The communications link 1315 can be configured to transmit (e.g., send, receive, signal, etc.) communications packets 1338 comprising any organization of data items. The data items can comprise a payload data area 1337, a destination address 1336 (e.g., a destination IP address), a source address 1335 (e.g., a source IP address), and can include various encodings or formatting of bit fields to populate the shown packet characteristics 1334. In some cases the packet characteristics include a version identifier, a packet or payload length, a traffic class, a flow label, etc. In some cases the payload data area 1337 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1331, which in turn can be formatted into any one or more storage areas, and which can comprise parameterized storage 1339 accessible by a key (e.g., filename, table name, block address, offset address, etc.).

Execution of the sequences of instructions to practice certain embodiments of the disclosure are performed by a single instance of the computer system 13A00. According to certain embodiments of the disclosure, two or more instances of computer system 13A00 coupled by a communications link 1315 (e.g., LAN, PTSN, or wireless network) may perform the sequence of instructions required to practice embodiments of the disclosure using two or more instances of components of computer system 13A00.

The computer system 13A00 may transmit and receive messages such as data and/or instructions organized into a data structure (e.g., communications packets 1338). The data structure can include program instructions (e.g., application code 1303), communicated through communications link 1315 and communications interface 1314. Received program code may be executed by processor 1307 as it is received and/or stored in the shown storage device or in or upon any other non-volatile storage for later execution. Computer system 13A00 may communicate through a data interface 1333 to a database 1332 on an external data repository 1331. Data items in a database can be accessed using a primary key (e.g., a relational database primary key).

The processing element partition 1301 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 1307. Some embodiments include one or more special-purpose hardware components (e.g., power control, logic, sensors, transducers, etc.). A module may include one or more state machines and/or combinational logic used to implement or facilitate the performance characteristics of age-based policies for determining database cache hits.

Various implementations of the database 1332 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of age-based policies for determining database cache hits). Such files or records can be brought into and/or stored in volatile or non-volatile memory.

Figure 13B:
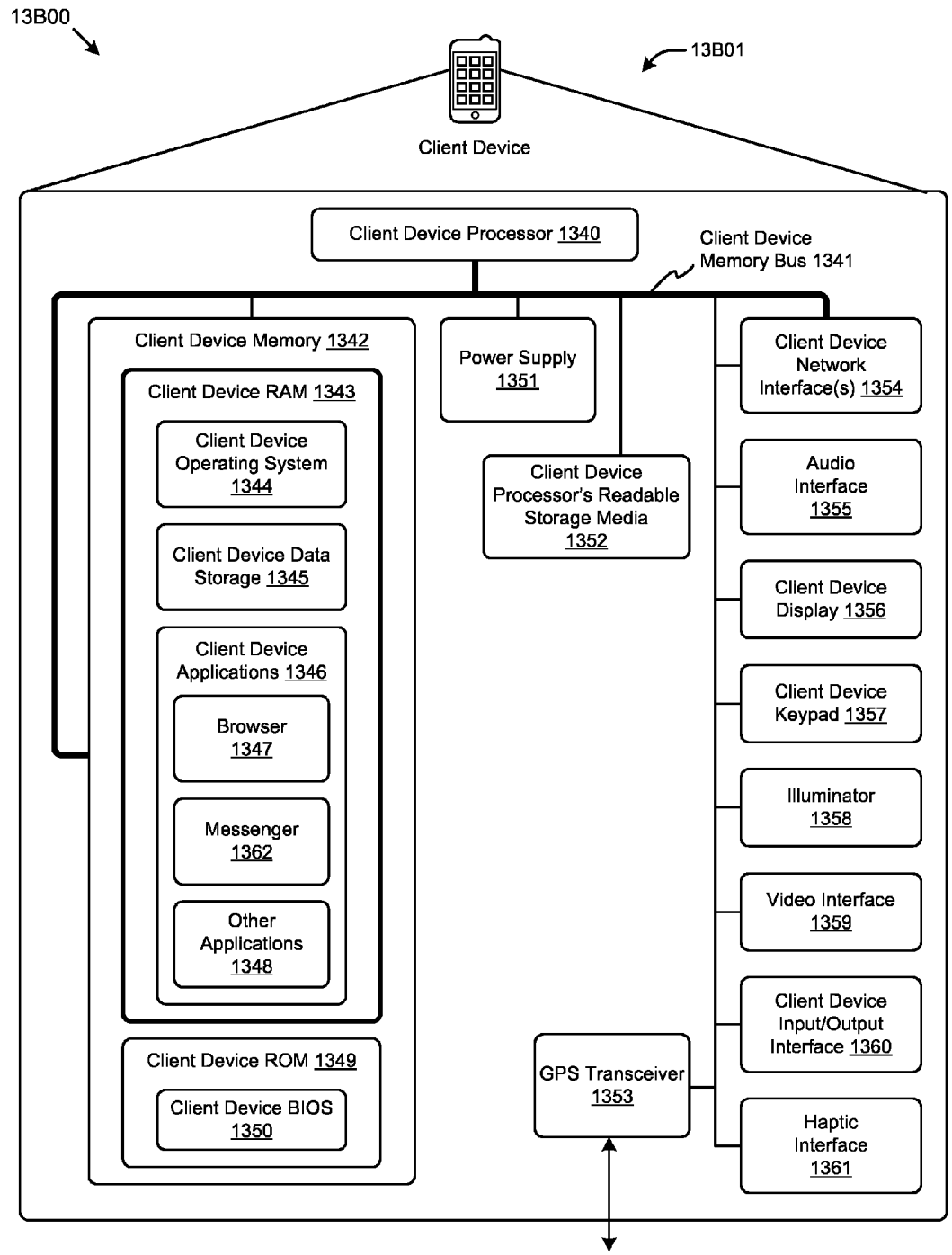

FIG. 13B depicts a block diagram 13B00 of an instance of a client device 13B01 that may be included in a system implementing instances of the herein-disclosed embodiments. Client device 13B01 may include many more or fewer components than those shown in FIG. 13B. Client device 13B01 may represent, for example, an embodiment of at least one of client devices as heretofore disclosed.

As shown in the figure, client device 13B01 includes a client device processor 1340 in communication with a client device memory 1342 via a client device memory bus 1341. Client device 13B01 also includes a power supply 1351, one or more client device network interfaces 1354, an audio interface 1355, a client device display 1356, a client device keypad 1357, an illuminator 1358, a video interface 1359, a client device IO interface 1360, a haptic interface 1361, and a GPS transceiver 1353 for global positioning services.

The power supply 1351 provides power to client device 13B01. A rechargeable or non-rechargeable battery may be used to provide power. The power may also be provided by an external power source such as an AC adapter or a powered docking cradle that supplements and/or recharges a battery.

A client device 13B01 may optionally communicate with a base station, or directly with another computing device. A client device network interface 1354 includes circuitry for coupling a client device 13B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 1355 is arranged to produce and receive audio signals such as the sound of a human voice. For example, audio interface 1355 may be coupled to a speaker and microphone to enable telecommunication with others and/or generate an audio acknowledgement for some action.

A client device display 1356 may be a liquid crystal display (LCD), gas plasma, light emitting diode (LED), or any other type of display used with a computing device. A client device display 1356 may also include a touch sensitive screen arranged to receive input from an object such as a stylus or a digit from a human hand.

A client device keypad 1357 may comprise any input device arranged to receive input from a user. For example, client device keypad 1357 may include a push button numeric dial, or a keyboard. A client device keypad 1357 may also include command buttons that are associated with selecting and sending images.

An illuminator 1358 may provide a status indication and/or provide light. Illuminator 1358 may remain active for specific periods of time or in response to events. For example, when the illuminator 1358 is active, it may backlight the buttons on client device keypad 1357 and stay on while the client device is powered. Also, the illuminator 1358 may backlight these buttons in various patterns when particular actions are performed such as dialing another client device. An illuminator 1358 may also cause light sources positioned within a transparent or translucent case of the client device to illuminate in response to actions.

A video interface 1359 is arranged to capture video images such as a still photo, a video segment, an infrared video or the like. For example, the video interface 1359 may be coupled to a digital video camera, a web-camera or the like. A video interface 1359 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 13B01 comprise a client device IO interface 1360 for communicating with external devices such as a headset, or other input or output devices not shown in FIG. 13B. The client device IO interface 1360 can use one or more communication technologies such as a USB, infrared, Bluetooth™ port or the like. A haptic interface 1361 is arranged to as a human interface device (HID) to facilitate interaction with a user of a client device. Such interaction can include tactile feedback to a user of the client device. For example, the haptic interface 1361 may be employed to cause vibration of the client device 13B01 in a particular way (e.g., with a pattern or periodicity) and/or when interacting with one or another user.

A GPS transceiver 1353 can determine the physical coordinates of client device 13B01 on the surface of the Earth. The GPS transceiver 1353, in some embodiments, may be optional. The shown GPS transceiver 1353 outputs a location such as a latitude value and a longitude value. However, the GPS transceiver 1353 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 13B01 on the surface of the Earth. It is understood that under different conditions, a GPS transceiver 1353 can determine a physical location within millimeters for client device 13B01; and in other cases, the determined physical location may be less precise such as within a meter or significantly greater distances. In certain embodiments, the client device 13B01 may provide other information that may be employed to determine a physical location of the device including, for example, a media access control (MAC) address, IP address, IP port identifier, or the like.

The client device memory 1342 includes random access memory 1343, read-only memory 1349, and other computer-readable storage. The client device memory 1342 illustrates an example of computer readable storage media (devices) for storage of information such as computer readable instructions, data structures, program modules or other data. The client device memory 1342 stores a basic IO system (BIOS) in the embodiment of client device BIOS 1350 for controlling low-level operation of client device 13B01. The memory also stores an operating system 1344 for controlling the operation of client device 13B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include or interface with a Java virtual machine module that enables control of hardware components and/or operating system operations via Java application programs.

The client device memory 1342 further includes one or more instances of client device data storage 1345, which can be used by client device 13B01 to store, among other things, client device applications 1346 and/or other data. For example, client device data storage 1345 may also be employed to store information that describes various capabilities of client device 13B01. The information may then be provided to another device based on any of a variety of events including being sent as part of a header during a communication, sent upon request or the like. Client device data storage 1345 may also be employed to store social networking information including address books, buddy lists, aliases, user profile information or the like. Further, client device data storage 1345 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 13B01, etc.

An instance of a client device processor's readable storage media 1352 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media may also be referred to herein as computer readable storage media.

The client device applications 1346 may include computer executable instructions which, when executed by client device 13B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1346 may include, for example, a messenger 1362, a browser 1347, and other applications 1348. Certain other applications 1348 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 1348 may collect and store user data that may be received from other computing devices in the environment.

A messenger 1362 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1362 may be configured as an IM application such as AOL (America Online) instant messenger, Yahoo! messenger, .NET messenger server, ICQ or the like. In certain embodiments, the messenger 1362 may be configured to include a mail user agent (MUA) such as Elm, Pine, message handling (MH), Outlook, Eudora, Mac Mail, Mozilla Thunderbird or the like. In another embodiment, the messenger 1362 may be a client device application that is configured to integrate and employ a variety of messaging protocols including, but not limited, to various push and/or pull mechanisms for client device 13B01. In certain embodiments, the messenger 1362 may interact with the browser 1347 for managing messages. As used herein, the term "message" refers to any of a variety of messaging formats, or communications form including, but not limited to, email, SMS, IM, MMS, IRC or the like.

A browser 1347 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1347 may enable a user of client device 13B01 to communicate with another network device as may be present in the environment.

Figure 13C:
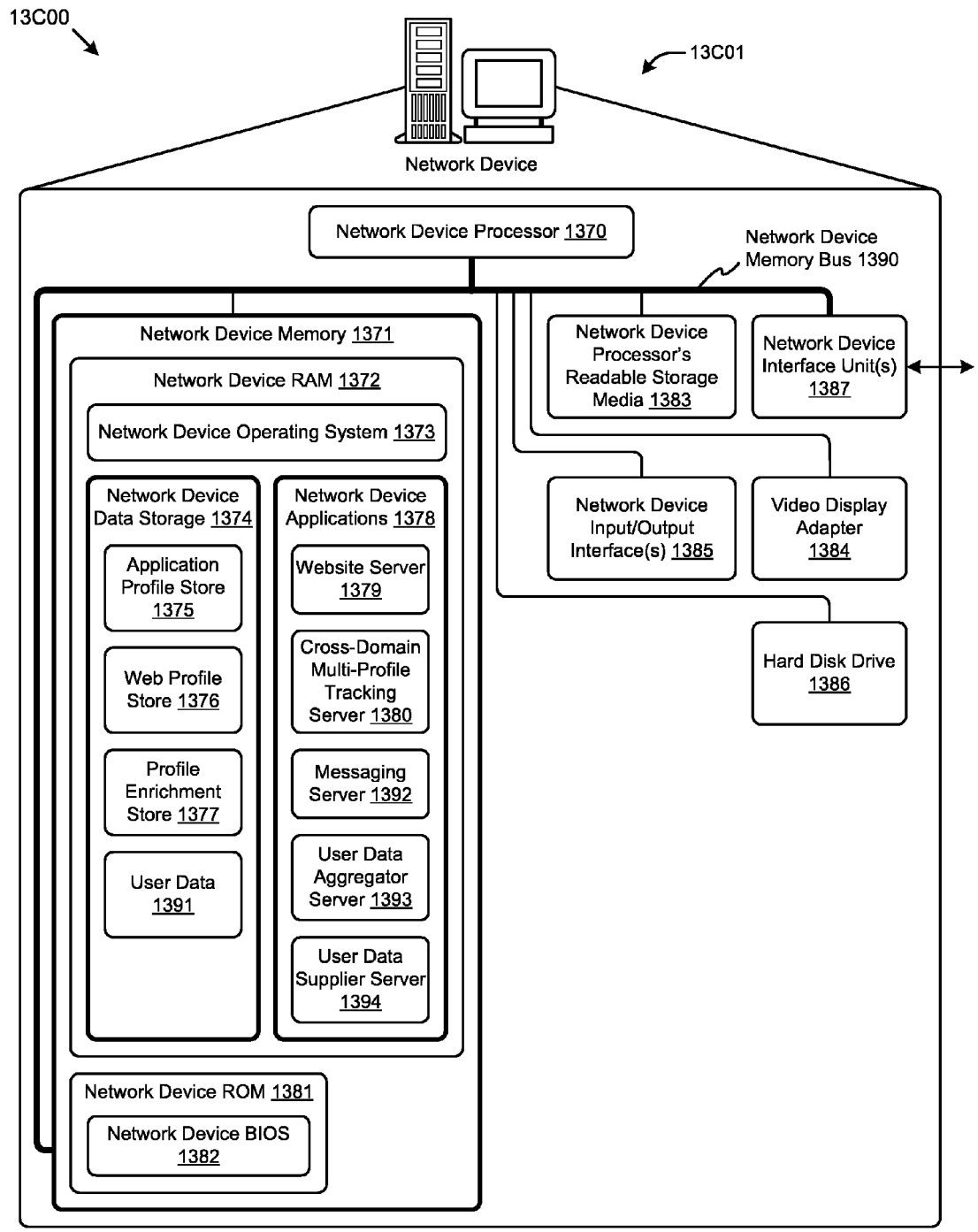

FIG. 13C depicts a block diagram 13C00 of an instance of a network device 13C01 that may be included in a system implementing instances of the herein-disclosed embodiments. Network device 13C01 may include many more or fewer components than those shown. Network device 13C01 may be configured to operate as a server, client, peer, a host, or any other device.

The network device 13C01 includes at least one instance of a network device processor 1370, instances of readable storage media, one or more instances of a network interface unit 1387, a network device IO interface 1385, a hard disk drive 1386, a video display adapter 1384, and a network device memory 1371, all in communication with each other via a network device memory bus 1390. The network device memory generally includes network device RAM 1372, network device ROM 1381. Some embodiments include one or more non-volatile mass storage devices such as a hard disk drive 1386, a tape drive, an optical drive, and/or a floppy disk drive. The network device memory stores a network device operating system 1373 for controlling the operation of network device 13C01. Any general-purpose operating system may be employed. A basic input/output system (BIOS) is also provided in the form of network device BIOS 1382 for controlling the low-level operation of network device 13C01. As illustrated in FIG. 13C, a network device 13C01 also can communicate with the Internet, or some other communications network, via a network interface unit 1387, which is constructed for use with various communication protocols including the TCP/IP protocol. A network interface unit 1387 is sometimes known as a transceiver, a transceiving device, or a network interface card (NIC). Network device 13C01 also comprises a network device IO interface 1385 for communicating with external devices such as a keyboard or other input or output devices. A network device IO interface 1385 can use one or more communication technologies such as USB, infrared, Bluetooth™ or the like.

The storage devices as described above may use various types of computer readable media, namely tangible forms of non-volatile computer readable storage media and/or a client device processor's readable storage media 1352 and/or a network device processor's readable storage media 1383. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 1374 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1374 may further include program code, data, algorithms and the like, for use by a processor such as a network device processor 1370 to execute and perform actions. In certain embodiments, at least some of the logical contents of network device data storage 1374 might be stored on another component of network device 13C01 such as on a second instance of hard disk drive 1386 or on an external/removable storage device.

The network device data storage 1374 may further store any portions of application data and/or user data such as an application profile store 1375, a web profile store 1376, a profile enrichment store 1377 and/or any user data collected. In some embodiments, user data 1391 may store unique user data, non-unique user data, aggregated user data, and/or any combination thereof. User data 1391 may include a variety of attributes such as a five digit zip code, an expanded nine digit zip code and the like.

The Network device data storage 1374 may also store program code and data. One or more network device applications 1378 may be loaded into network device data storage or any other mass memory, to be accessible to run with or as a part of network device operating system 1373. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1392, website server 1379, user data aggregator server 1393, a cross-domain multi-profile tracking server 1380, and/or user data supplier server 1394 may also be included within or implemented as application programs.

A messaging server 1392 may include virtually any computing component or components configured and arranged to forward messages from message user agents and/or other message servers, or to deliver messages to a local message store such as network device data storage 1374 or the like. Thus, a messaging server 1392 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1392 may also be managed by one or more components of the messaging server 1392. Thus, the messaging server 1392 may also be configured to manage SMS messages; IM, MMS, IRC, or RSS feeds; mIRC; or any of a variety of other message types. In certain embodiments, the messaging server 1392 may enable users to initiate and/or otherwise conduct chat sessions, VOIP sessions or the like.

A website server 1379 may represent any of a variety of information and services that are configured to provide content including messages, over a network to another computing device. Thus, a website server 1379 can include, for example, a web server, a file transfer protocol (FTP) server, a database server, a content server or the like. A website server 1379 may provide the content including messages over the network using any of a variety of formats including, but not limited to, WAP, HDML, WML, SGML, HTML, XML, compact HTML (cHTML), extensible HTML (xHTML) or the like. A website server 1379 may also be configured to enable a user of a client device to browse websites, upload user data, view and interact with advertisements or the like.

A user data aggregator server 1393 is configured to aggregate user data to be provided to user data buyers for advertising campaigns. In certain embodiments, a user data aggregator server 1393 may be configured to receive collected user data from a user data supplier server 1394. In some embodiments, a user data aggregator server 1393 may receive a query for user data. Based on the query, a user data aggregator server 1393 may generate a plurality of subsets of aggregated user data. In some embodiments, user data aggregator server 1393 may be included in a network device.

A user data supplier server 1394 is configured to collect user data. In certain embodiments, the user data supplier server 1394 may be configured to provide the collected user data to user data aggregator server 1393. In some embodiments, the user data supplier server 1394 may collect and/or provide unique user data and/or non-unique user data. In certain embodiments, the user data supplier server 1394 may aggregate the collected user data. In some embodiments, the user data supplier server 1394 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks, are in communication with, and enables communication between components in the environment.

Instances of client devices may include virtually any computing device capable of communicating over a network to send and receive information including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   maintaining, in a cache of data comprising data that is also stored in a database, a data item and metadata associated with the data item, wherein the metadata indicates when the data item was last marked as in sync with the database;
   receiving a policy that indicates a cutoff point, wherein, according to the cutoff point, data last marked, by the metadata, as reflecting data stored in the database at any particular point before the cutoff point is deemed invalid and data last marked, by the metadata, as reflecting data stored in the database at any particular point after the cutoff point is deemed valid;
   processing a request for a plurality of data items comprising the data item, wherein, according to the policy, return of the data item from the cache is conditional upon evaluation of the cutoff point relative to the metadata associated with the data item;
   comparing the metadata associated with the data item to the cutoff point to determine whether the data item is valid; and
   in response to determining that the data item in the cache is valid, returning the data item from the cache.

2. The method of claim 1, further comprising accessing the database to retrieve another data item of the data when the policy is not met.

3. The method of claim 2, further comprising returning indicator metadata corresponding to the another data item.

4. The method of claim 3, wherein the another data item and the indicator metadata associated with the another data item is determined to be invalid.

5. The method of claim 1, wherein the cutoff point comprises at least one of, a cutoff type, or a date cutoff type identifier, or a sequence cutoff type identifier, or any combination thereto.

6. The method of claim 1, wherein the cutoff point corresponds to a project start time.

7. The method of claim 1, wherein the data item comprises at least one of, personalization data, or a web page link, or a combination thereto.

8. The method of claim 1, wherein the policy is received as part of the request.

9. The method of claim 8, wherein the policy is received after being accessed from storage where it was stored before the request was received.

10. The method of claim 1, wherein the metadata indicates when the data item was last marked as in sync with the database by using a timestamp of a last update to the data item.

11. The method of claim 1, wherein the metadata indicates when the data item was last marked as in sync with the database by using a sequential marking of a last update to the data item, wherein the sequential marking is relative to other sequential markings of other updates to data items.

12. The method of claim 1, wherein the cutoff point is before a particular time that the request was received.

13. The method of claim 1, wherein the cutoff point is after a particular time that a project request was received, wherein the project request specifies other requested operations that can be carried out independently of the request for the plurality of data items, and wherein the request for the plurality of data items is delayed until the cutoff point, and wherein at least one of the other requested operations is not delayed until the cutoff point.

14. The method of claim 1, wherein the cutoff point is after a particular time that a project request was received, wherein the project request specifies other requested operations that can be carried out independently of the request for the plurality of data items, and wherein at least one of the other requested operations is not delayed until the cutoff point.

15. The method of claim 1, wherein data last marked as in sync at the cutoff point is also deemed valid.

16. A computer program product, embodied in a non-transitory computer readable medium, the computer readable medium having stored thereon a sequence of instructions which, when executed by a processor causes the processor to perform acts, the acts comprising:
   maintaining, in a cache of data comprising data that is also stored in a database, a data item and metadata associated with the data item, wherein the metadata indicates when the data item was last marked as in sync with the database;
   receiving a policy that indicates a cutoff point, wherein, according to the cutoff point, data last marked, by the metadata, as reflecting data stored in the database at any particular point before the cutoff point is deemed invalid and data last marked, by the metadata, as reflecting data stored in the database at any particular point after the cutoff point is deemed valid;

processing a request for a plurality of data items comprising the data item, wherein, according to the policy, return of the data item from the cache is conditional upon evaluation of the cutoff point relative to the metadata associated with the data item;

comparing the metadata associated with the data item to the cutoff point to determine whether the data item is valid; and in response to determining that the data item in the cache is valid, returning the data item from the cache.

17. The computer program product of claim 16, further comprising accessing the database to retrieve another data item of the data when the policy is not met.

18. The computer program product of claim 17, further comprising returning indicator metadata corresponding to the another data item.

19. The computer program product of claim 18, wherein the another data item and the indicator metadata associated with the another data item is determined to be invalid.

20. The computer program product of claim 16, wherein the cutoff point comprises at least one of, a cutoff type, or a date cutoff type identifier, or a sequence cutoff type identifier, or any combination thereto.

21. A system comprising:

a storage device that maintains, in a cache of data comprising data that is also stored in a database, a data item and metadata associated with the data item, wherein the metadata indicates when the data item was last marked as in sync with the database;

a database cache to,
receive a policy that indicates a cutoff point, wherein, according to the cutoff point, data last marked, by the metadata, as reflecting data stored in the database at any particular point before the cutoff point is deemed invalid and data last marked, by the metadata, as reflecting data stored in the database at any particular point after the cutoff point is deemed valid; and to process a request for a plurality of data items comprising the data item, wherein, according to the policy, return of the data item from the cache is conditional upon evaluation of the cutoff point relative to the metadata associated with the data item;

a comparator to compare the metadata associated with the data item to the cutoff point to determine whether the data item is valid; and a database access interface module to return, in response to determining that the data item in the cache is valid, the data item from the cache.

22. The system claim 21, further comprising accessing the database to retrieve another data item of the data when the policy is not met.

23. The system of claim 22, further comprising returning indicator metadata corresponding to the another data item.

24. The system of claim 23, wherein the another data item and the indicator metadata associated with the another data item is determined to be invalid.

25. The system of claim 21, wherein the cutoff point comprises at least one of, a cutoff type, or a date cutoff type identifier, or a sequence cutoff type identifier, or any combination thereto.

26. The system of claim 21, wherein the cutoff point corresponds to a project start time.

* * * * *

UNITED STATES PATENT AND TRADEMARK OFFICE
CERTIFICATE OF CORRECTION

PATENT NO.       : 9,898,498 B2
APPLICATION NO.  : 14/798293
DATED            : February 20, 2018
INVENTOR(S)      : Tuatini et al.

Page 1 of 1

It is certified that error appears in the above-identified patent and that said Letters Patent is hereby corrected as shown below:

In the Specification

In Column 7, Line 62, delete "the of" and insert -- the --, therefor.

In Column 27, Line 1, delete "PTSN," and insert -- PSTN, --, therefor.

In the Claims

In Column 38, Line 20, in Claim 22, after "system" insert -- of --.

Signed and Sealed this
Twenty-eighth Day of August, 2018

Andrei Iancu
*Director of the United States Patent and Trademark Office*